(12) United States Patent
Okubo et al.

(10) Patent No.: US 6,456,390 B1
(45) Date of Patent: Sep. 24, 2002

(54) IMAGE PROCESSING DEVICE, IMAGE PROCESSING METHOD AND RECORDING MEDIUM

(75) Inventors: Hiroshi Okubo; Kazuhito Konno, both of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/444,870

(22) Filed: Nov. 22, 1999

(30) Foreign Application Priority Data

Nov. 30, 1998 (JP) .......................................... 10-340598

(51) Int. Cl.$^7$ ............................................. G06K 15/20
(52) U.S. Cl. ..................................................... 358/1.17
(58) Field of Search ........................... 358/1.1, 1.8, 1.3, 358/1.16, 1.17, 461, 1.18, 404, 444, 524, 1.13; 347/239, 244, 243, 255, 256, 258, 135, 137; 345/561, 562, 570, 571, 556

(56) References Cited

U.S. PATENT DOCUMENTS 6,052,199 A * 4/2000 Honda ........................ 358/1.16
6,178,006 B1 * 1/2001 Pagan ......................... 347/239

FOREIGN PATENT DOCUMENTS

JP Hei. 3-114856 5/1991
JP Hei. 9-319698 12/1997

* cited by examiner

Primary Examiner—Arthur G. Evans
(74) Attorney, Agent, or Firm—Morgan, Lewis & Bockius LLP

(57) ABSTRACT

The present invention provides an image processing device, an image processing method, and a recording medium that supply the intermediate code image data generated for each band to the hardware rendering mechanism at high speed and enhance the efficiency of a memory in use. In the image processing device, a host processing unit receives and interprets incoming PDL data, creates intermediate code image data for each band, and supplies it to an intermediate code image data holding block management unit. The intermediate code image data holding block management unit reserves intermediate code image data holding areas on the memory, and stores intermediate code image data holding blocks and management information in the areas with continuous addresses. The management information is rewritten into descriptors, which are supplied to a DMA controller, and the intermediate code image data is sequentially transferred to a rendering unit by the chained DMA transfer system. And, raster-expanded bit map data in the rendering unit is supplied to band buffers, which is delivered to the output device under the control of a band buffer read/write controller.

11 Claims, 18 Drawing Sheets

MANAGEMENT INFORMATION Mia: POINTER TO THE NEXT INTERMEDIATE CODE IMAGE DATA HOLDING BLOCK
MANAGEMENT INFORMATION Mib: POINTER TO THE PRECEDENT INTERMEDIATE CODE IMAGE DATA HOLDING BLOCK
MANAGEMENT INFORMATION Mic: MANAGEMENT INFOR- + TOTAL QUANTITY OF INTERMEDIATE
                                MATION SIZE        CODE IMAGE DATA
MANAGEMENT INFORMATION Mid: VIRGIN

IMAGE PROCESSING DEVICE, IMAGE PROCESSING METHOD AND RECORDING MEDIUM

BACKGROUND OF THE INVENTION

1. Field of the Invention

The present invention relates to an image processing device and an image processing method that convert input image information into intermediate code image data by band and execute rendering processing (conversion into bit map data) by supplying the converted intermediate code image data to a rendering mechanism, and a recording medium for the same.

2. Description of the Related Art

In a conventional image processing device, which does not have a memory sufficient for expanding the data for one page of an output image into the bit map data, divides the one page into multiple bands, and possesses multiple buffers (hereafter, referred to as "band buffer")equivalent to the size of each band, it is required that input image information is temporarily converted into the format of the intermediate code image data.

As the intermediate code image data, when viewed from a band-divided original image (band image), there are one based on the run-length format of low abstraction and another one called as the display list of high abstraction, which is described by the plotting command format. In generating the intermediate code image data, except for a case that the input image information is generated in view of the band width in advance, since the generation of the intermediate code image data is sequentially conducted by band corresponding to the plotting position of the input image information, it is impossible to reserve areas (hereinafter, referred to as "intermediate code image data holding blocks")for retaining the intermediate code image data collectively by band.

As a conventional technique for effectively holding the intermediate code image data, in the Japanese Published Unexamined Patent Application No. Hei 3-114856 (hereunder referred to as the first published application) is disclosed a system furnished with two band buffers. In this system, as the intermediate code image data is generated by band, first the intermediate code image data is stored in the basic block of the minimum capacity; and if the image data exceeds the capacity of the basic block, an extended block capable of holding some capacity of data is reserved to hold the intermediate code image data, and an intermediate code image data control table is provided which associates the block being used with the band.

Incidentally, as the input image information for one page is completed to be converted into the intermediate code image data, a rendering mechanism starts interpreting sequentially by band the intermediate code image data in the intermediate code image data holding blocks controlled by band, the data thus interpreted is written in the band buffers as the bit map data, and at the moment when the whole processing of the intermediate code image data in that band is completed, the bit map data is transferred to an output device.

If a runaway type printer (a printer which, once an output instruction is given, cannot stop its output on the way such as a laser printer) is used in this case, it will be necessary to expand the intermediate code image data into raster data in real time and supply the raster-expanded data to the printer. Here, if a speed by which the bit map data is generated in each band buffer is not faster than the printing speed of the printer, there will occur an overrun error (void resulting from failure in printing of the image by the concerned bit map data). Hence, before starting the rendering mechanism, a check is made by each band as to whether or not the speed of generating the bit map data in the band buffers exceeds the printing speed.

A hardware rendering mechanism is an implementation used in maintaining the rendering speed always faster than the printing speed, without deteriorating the picture quality of an output image. In the use of this hardware rendering mechanism, it is necessary to effectively supply the hardware rendering mechanism with the intermediate code image data holding blocks which are controlled by band and stored to be distributed on the memory.

A DMA (Direct Memory Access) transfer is a method that effectively supplies the hardware rendering mechanism with the intermediate code image data holding blocks, and a chained DMA control system makes it possible to transfer data areas distributed on the memory by starting the DMA once. The information that controls the DMA controller in that case is retained by a descriptor including at least information regarding a source transfer address and a transfer data quantity. As a conventional technique of the chained DMA control system, in the Japanese Published Unexamined Patent Application No. Hei 9-319698 (hereunder, referred to as the second published application) has been disclosed a technique regarding the DMA transfer system, in which the descriptor and the transfer data are retained in a continuous region on a memory in a system furnished with a PCI (Peripheral Communication Interconnect) bus.

In the first published application, however, it has been necessary to reserve the basic block of the minimum capacity on the memory and the extended block of a larger capacity than the basic block, in order to store the intermediate code image data. And, when the quantity of the intermediate code image data is equal to (the above minimum capacity $+\alpha$), for example, the efficiency of the memory in use has been low. Further, there has not been disclosed any countermeasure in case the intermediate code image data cannot still be retained because of a larger quantity of the intermediate code image data, even though the extended block is reserved. Furthermore, there has not been any reference as to the mechanism that effectively supplies the rendering unit with the intermediate code image data and generates the bit map data in the band buffers.

Next, when the intermediate code image data is intended to be supplied to the rendering mechanism by means of the chained DMA transfer disclosed in the second published application, it has been necessary, after determining the transfer data, to reserve a fresh area for the descriptor on the memory and set the management information therein. Furthermore, it requires a stock register (a register for holding the descriptor looked ahead), and has a system restriction that necessarily contains the PCI bus.

SUMMARY OF THE INVENTION

The present invention has been made in view of such problems which the conventional technique holds, and provides an image processing device and an image processing method that supply the intermediate code image data generated by band to a hardware rendering mechanism at high speed and enhance the efficiency of the memory in use, and a recording medium for the same.

The image processing device of the present invention has a generation part that interprets the contents of code image data and generates multiple pieces of intermediate code image data for bands formed by dividing a page, a storage part that stores the multiple pieces of the intermediate code image data generated by the generation part, a relation part that relates each of the storage locations of the multiple pieces of intermediate code image data in the storage part with specific orders, a transfer part that refers to the storage locations related by the relation part, reads the multiple pieces of intermediate code image data sequentially from the storage part, and transfers them, and a plotting part that receives the multiple pieces of the intermediate code image data transferred from the transfer part, interprets their contents to execute plotting of images, and stores image data of the plotted images in a buffer memory.

In the image processing device, the relation part may relate each piece of the intermediate code image data to each band, and may relate any pieces of the intermediate code image data with each other in the bands.

The image processing device may further have a part that attaches management information including information about its own data quantity to each piece of the intermediate code image data, and the relation part may hold, in the management information of each piece of the intermediate code image data, information about the storage location in the storage part of the other piece of the intermediate code image data selected in consideration of plotting orders.

In the image processing device, the transfer part may further have a management information utilization part that appropriately rewrites the management information and utilizes it as transfer management information for executing a DMA transfer, and a DMA control part that sequentially reads the management information appropriately rewritten by the management information utilization part, and transfers the intermediate code image data stored in the storage part to the plotting part.

The image processing device may further have a band partition information adding part that adds band partition information indicating a partition between the bands to each piece of the intermediate code image data stored by the storage part, and the plotting part plots the multiple pieces of the intermediate code image data transferred by the transfer part by band in accordance with the band partition information.

The image processing device may further have a page partition information adding part that adds page partition information indicating a partition between the pages to the last piece of the intermediate code image data in a page according to the plotting order, of the intermediate code image data stored by the storage part, and the plotting part terminates plotting for one page by plotting the intermediate code image data having the page partition information added.

In the image processing device, the band partition information adding part may transfer the band partition information from the band not having plotting components to the piece of the intermediate code image data in the other band having the plotting components.

In the image processing device, the page partition information adding part may transfer the page partition information from the band not having the plotting components to the piece of the intermediate code image data in the other band having the plotting components.

The image processing device may further have an output part that reads image data stored in the buffer memory to output it to an output device, and, when switching a front image and a rear image for a double face printing by page to output them to the output device, the transfer part has a part that switches for each page a reading order of the intermediate code image data from the storage part, and the output part has a part that switches a reading direction in unit of page when reading the image data stored in the buffer memory to output it to the output device.

The image processing method of the present invention includes a generation step that interprets contents of code image data and generates multiple pieces of intermediate code image data for respective bands formed by dividing a page, a storage step that stores the multiple pieces of the intermediate code image data generated by the generation step in a storage part, a relation step that relates each of storage locations of multiple pieces of the intermediate code image data in the storage part in specific orders, a transfer step that refers to the storage locations related by the relation step, reads the multiple pieces of intermediate code image data sequentially from the storage part, and transfers them, and a plotting step that receives the multiple pieces of the intermediate code image data, interprets their contents to execute plotting of images, and stores the image data of the plotted images in a buffer memory.

The recording medium of the present invention records a program to execute the image processing method.

In the image processing device, the image processing method, or the recording medium as such, the management information used for management of the intermediate code image data holding block is rewritten into the descriptor being the transfer control information which is supplied to the DMA controller, whereby the chained DMA transfer system can be achieved, and the intermediate code image data can efficiently be transferred to the hardware rendering mechanism.

Further, the intermediate code image data indicating the band partition and the page partition is newly defined to the intermediate code image data transferred to the hardware rendering mechanism in unit of band or in unit of page, and this intermediate code image data is interpreted by the hardware rendering mechanism, whereby the rendering processing becomes possible in unit of band and in unit of page. And, the Duplex (processing to rotate the image by 180°, which is required for the rear face printing in the double face printing) is facilitated by inverting the order of linking the intermediate code image data holding blocks.

BRIEF DESCRIPTION OF THE DRAWINGS

Preferred embodiments of the present invention are now described in detail based on the following drawings.

DESCRIPTION OF THE PREFERRED EMBODIMENTS

The preferred embodiments of the present invention will be described in detail with reference to the accompanying drawings.

Figure 1:
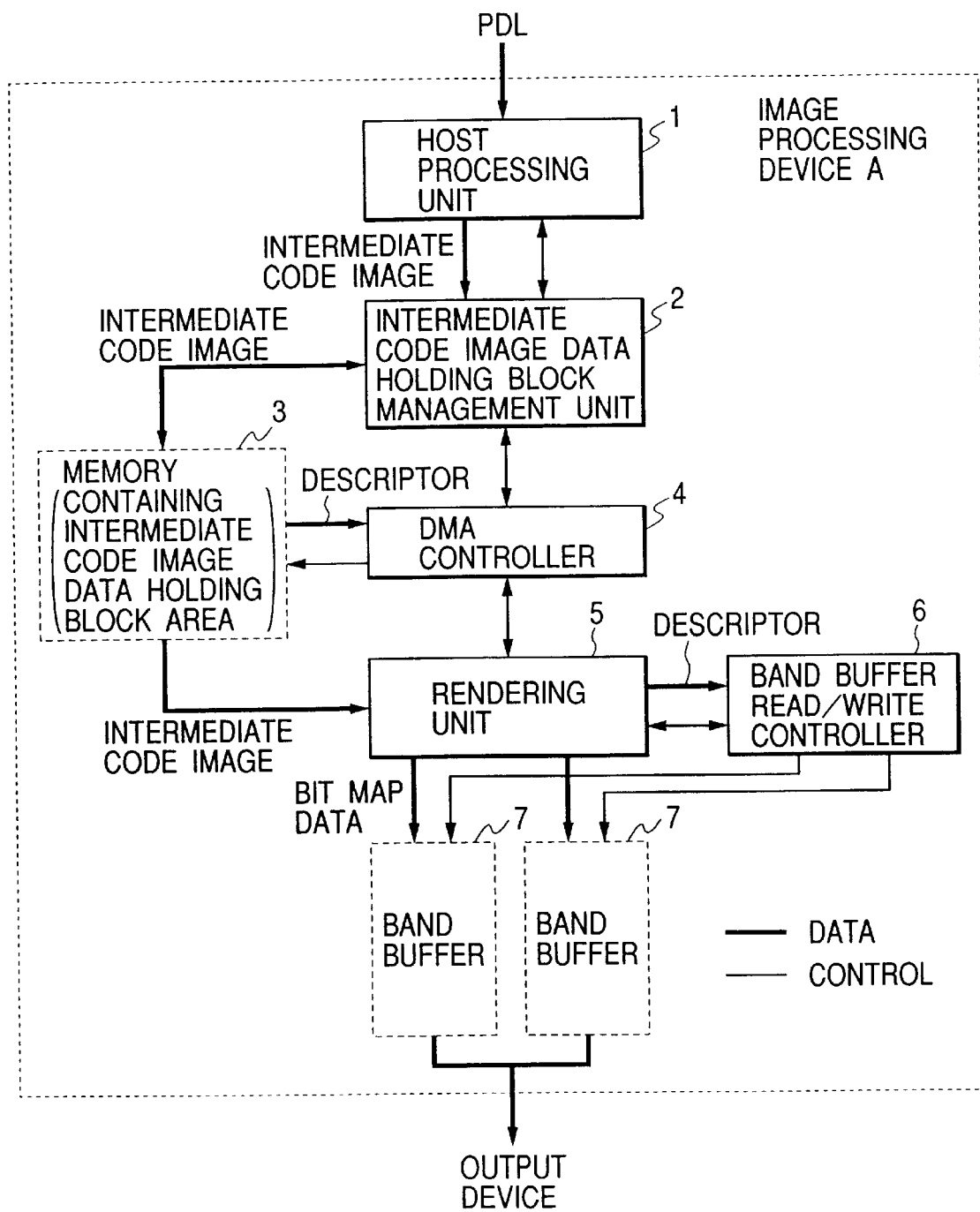
FIG. 1 is a block diagram of an image processing device A relating to one embodiment of the present invention.

1. First Embodiment 1.1. Configuration of the Embodiment 1.1.1 Functional Configuration FIG. 1 is a block diagram of an image processing device A relating to the first embodiment of the present invention.

The image processing device A is comprised of a host processing unit 1 that interprets PDLs (Page Description Language) being code image data supplied from outside, an intermediate code image data holding block management unit 2, a memory 3 having an intermediate code image data holding block area, a DMA controller 4, a rendering unit 5, a band buffer read/write controller 6, and band buffers 7.

The host processing unit 1, receiving PDL data as input image information through a network or an external disk, reads the contents of the data and interprets it word by word. If this interpretation shows data that represents any of the plotting objects (graphics, fonts, images, etc.), the host processing unit 1 deduces a corresponding band number (indexes of bands made by dividing one page) from the positional information of the data in the image space, and generates intermediate code image data for the band corresponding to the deduced band number.

The intermediate code image data holding block management unit 2 controls the generated intermediate code image data by band, and only when the intermediate code image data is generated to each of the bands, it reserves an intermediate code image data holding block in an intermediate code image data holding block area, and stores the intermediate code image data in this block.

The memory 3 ensures the intermediate code image data holding block areas composed of the aggregates of the intermediate code image data holding blocks. Supplied with a descriptor (including at least information regarding the address a data transferor and the transferred quantity of the data) which is management information for the DMA transfer, the DMA controller 4 executes the DMA transfer of the intermediate code image data to the rendering unit 5. The rendering unit 5 interprets the contents of the transferred intermediate code image data, generates raster-expanded bit map data, receives a command from the band buffer read/write controller 6, and supplies the bit map data to the band buffers 7 at specific timing. The bit map data is transferred to the output device accordingly. Further, the band buffers 7 are assigned the system memories having a necessary bite number.

1.1.2 Hardware Configuration

Figure 18:
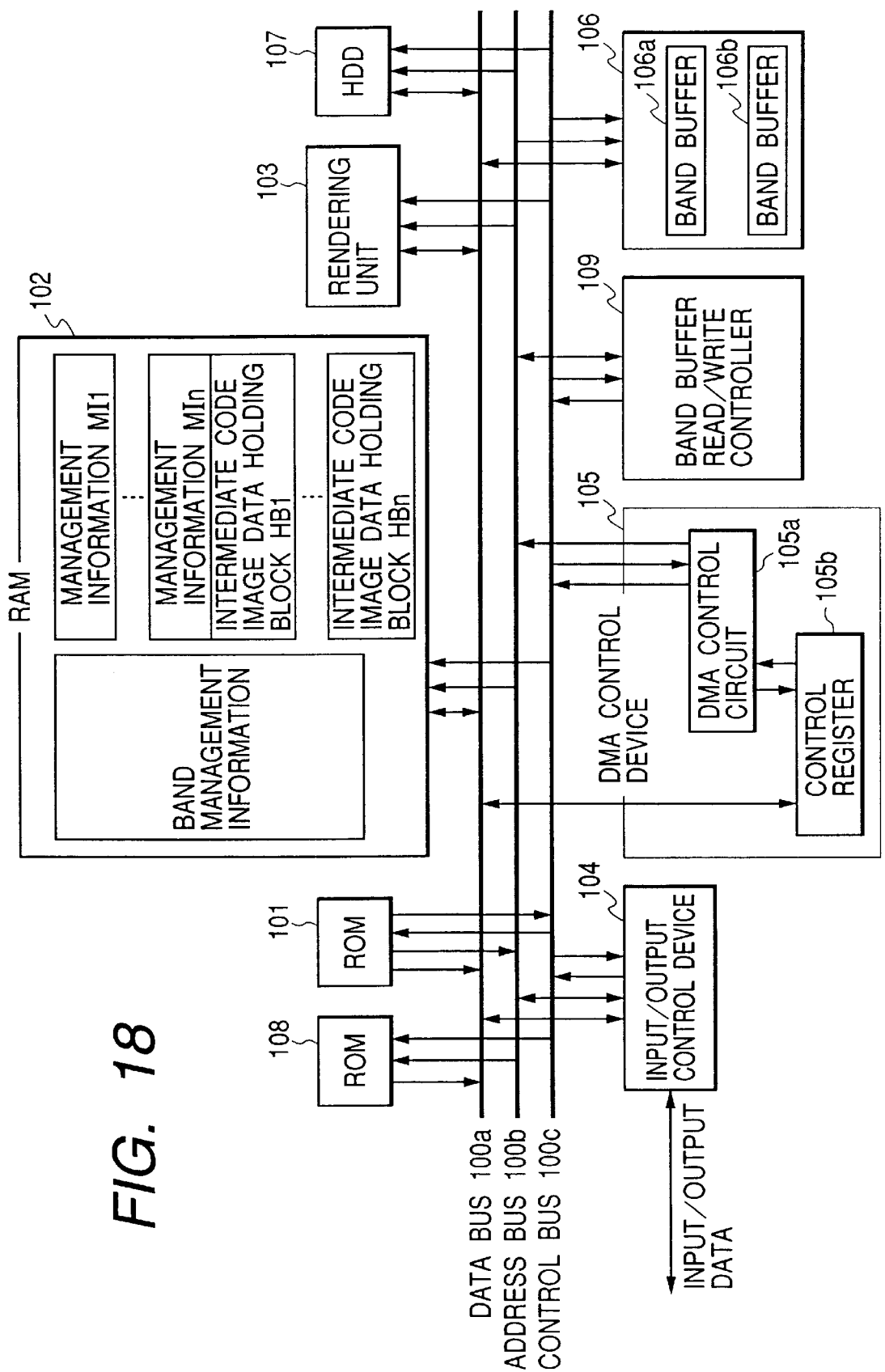
FIG. 18 is a block diagram to illustrate a hardware configuration of the image processing device relating to the above embodiment.

FIG. 18 is a block diagram to illustrate a hardware configuration of the image processing device A.

As shown in FIG. 18, the image processing device A is comprised of a CPU 101, a RAM 102, a rendering unit 103, an input/output control device 104, a DMA control device 105, a band buffer 106, an HDD (hard disk drive) 107, and a ROM 108; and these devices are connected through a data bus 100a, an address bus 100b, and a control bus 100c.

Each piece of management information stored in the RAM 102 is rewritten into the respective descriptors as mentioned later, which serves as the descriptors. The descriptors are sequentially accepted by a control register 105b in the DMA control device 105, and the DMA transfer is implemented under the control of a DMA control circuit 105a.

To be concrete, the DMA control circuit 105a looks up the address transfer source of the descriptor accepted by the control register 105b, reads the intermediate code image data stored in the intermediate code image data holding blocks, and implements the DMA transfer while transferring the intermediate code image data to the rendering unit 103.

And, the data with the raster expansion applied by the rendering unit 103 is handled by a band buffer read/write controller 109, which is transferred to the band buffer 106.

Further, the program to rewrite the management information into the descriptors and the program to execute the DMA transfer are read from the HDD 107 to be stored in the ROM 102, or they are stored in the ROM 108; and the CPU 101 executes these programs.

1.1.3. Memory Mapping Configuration

Figure 3:
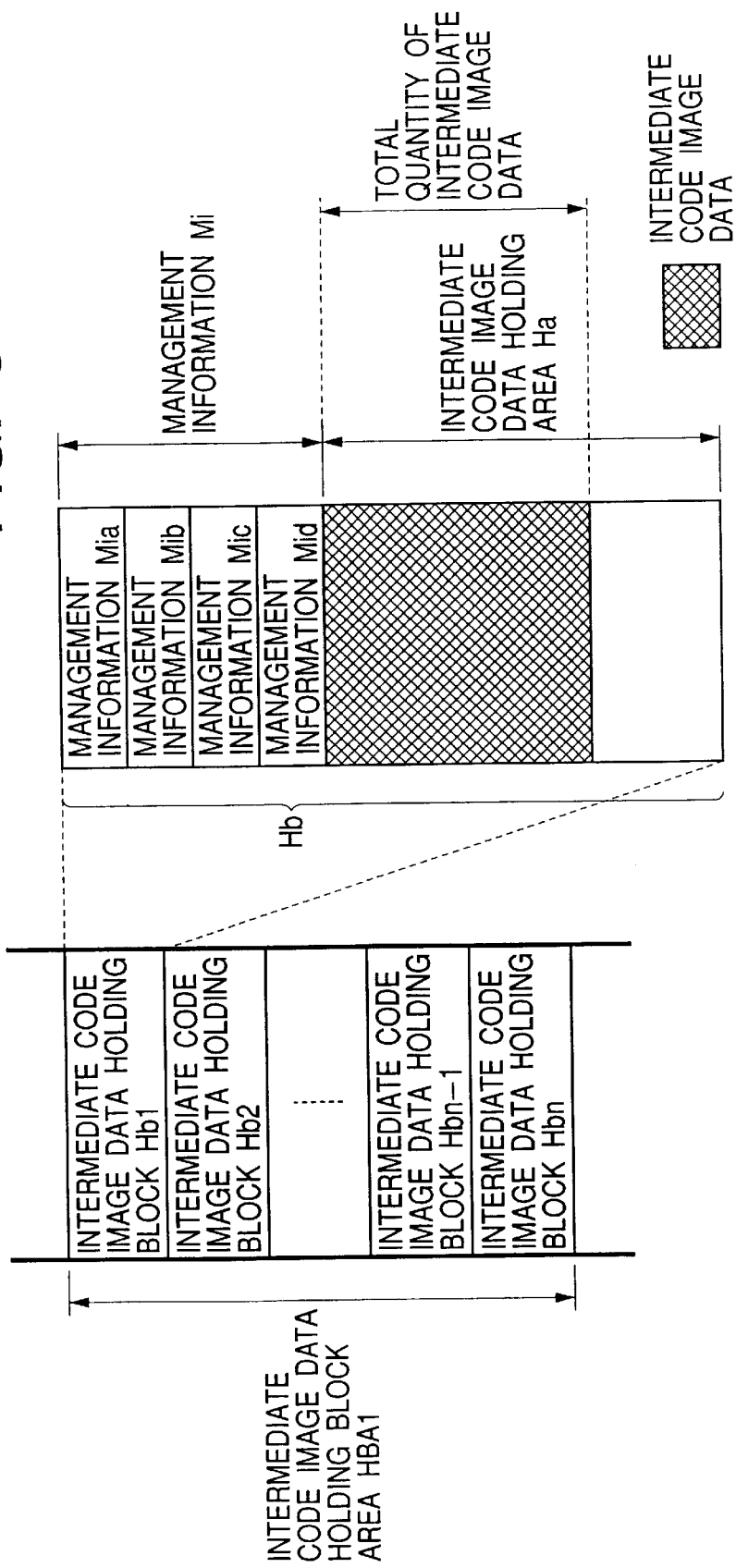
FIG. 3 is a chart to illustrate a layout of the intermediate code image data holding blocks and a configuration of each of the intermediate code image data holding blocks in the memory of the above embodiment.
Figure 4:
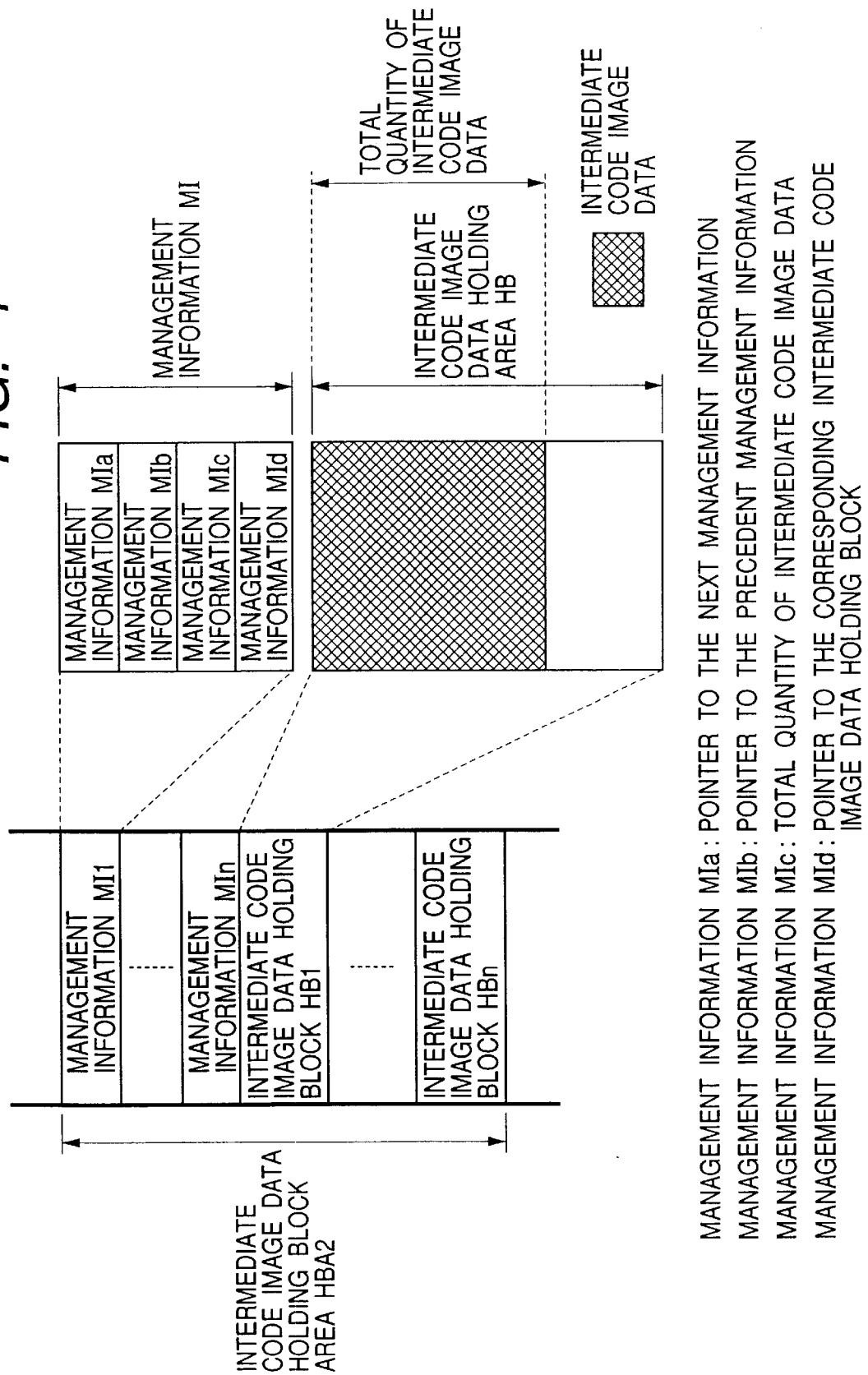
FIG. 4 is a chart to illustrate a layout of the intermediate code image data holding blocks and a configuration of each of the intermediate code image data holding blocks in the memory of the above embodiment.

As a memory mapping configuration that reserves the intermediate code image data holding block, there are, for example, two cases as shown in FIG. 3 and FIG. 4.

FIG. 3 illustrates the layout of an intermediate code image data holding block HBA1 reserved in the memory 3, and the format of intermediate code image data holding blocks Hb.

Thus, in the intermediate code image data holding block HBA1, the intermediate code image data holding blocks Hb (Hb1, Hb2, ... , Hbn) having the same size is stored in the continuous addresses. And, each of the intermediate code image data holding blocks Hb is comprised of management information Mi (Mia, Mib, Mic, Mid) and an intermediate code image data holding area Ha (this type of configuration of the intermediate code image data holding blocks including the management information is referred to as the "integral configuration").

The area of the management information Mia holds a pointer for the next intermediate code image data holding block, and the area of the management information Mib holds a pointer for the previous intermediate code image data holding block. And, by the management information Mia, Mib, bidirectional list structures are formed between the holding blocks. The area of the management information Mic holds the total value of the management information sizes and the total value of the intermediate code image data sizes, and the area of the management information Mid is virgin.

FIG. 4 illustrates another example of the memory mapping configuration, in which the management information and the intermediate code image data contained in the intermediate code image data holding blocks shown in FIG. 3 are each separated and stored in the memory 3.

In this case, the intermediate code image data holding blocks HB (HB1, HB2, . . . , HBn) having the same size are comprised of the intermediate code image data only, and these are stored in the areas of continuous addresses on the memory 3. On the other hand, the management information MI (MI1, MI2, . . . , Min) corresponding to the intermediate code image data holding blocks HB is also stored in the areas of continuous addresses on the memory 3. And, these management information groups and the intermediate code image data block groups are stored in the continuous addresses in the intermediate code image data holding block area HBA2 (this type of configuration is referred to as the "discrete configuration").

The management information MI is comprised of management information MIa, MIb, MIc, and MId. The area of the management information MIa holds a pointer for the next management information MI, and the area of the management information MIb holds a pointer for the previous management information MI. The area of the management information MIc holds the total value of the intermediate code image data quantity in the corresponding intermediate code image data holding block HB, and the area of the management information MId holds a pointer to the corresponding intermediate code image data holding block HB.

Hence, in order to trace a subsequent intermediate code image data holding block from a certain intermediate code image data holding block, first the system of this embodiment looks up management information MIa of management information MI corresponding to the certain intermediate code image data holding block, accesses the address of subsequent management information MI, and looks up a management information MId of this management information MI; and thereby the access to the address of the subsequent intermediate code image data holding block becomes possible. Likewise, in order to trace one previous intermediate code image data holding block from the certain intermediate code image data holding block, management information MIb and management information MId in immediately precedent management information MI are looked up.

Thus, the bidirectional linkage between the intermediate code image data holding blocks is established, in the data configuration on the memory 3 as shown in FIG. 3 and FIG. 4. This is mainly because the data quantity is intended to be reduced by searching overlapped plotting areas between adjacent intermediate code image data at high speed, while executing the superposed graphic processing described later, as a countermeasure when the holding blocks cannot be reserved because of a large quantity of the image data.

The intermediate code image data holding block and the management information are correspondent in one to one as the memory mapping configuration of the intermediate code image data holding block area, whether either configuration of the foregoing HBA1 or HBA2 is adopted. Since it supports not the blocks of different sizes, as disclosed in the first published application, but the blocks of the same size, this embodiment facilitates the control of the intermediate code image data. Further, since it stores the intermediate code image data holding blocks including the management information in the areas of continuous addresses on the memory, the embodiment enhances the efficiency of the memory in use.

1.2. Operation of the Embodiment 1.2.1. Basic Operation Sequence

Figure 5:
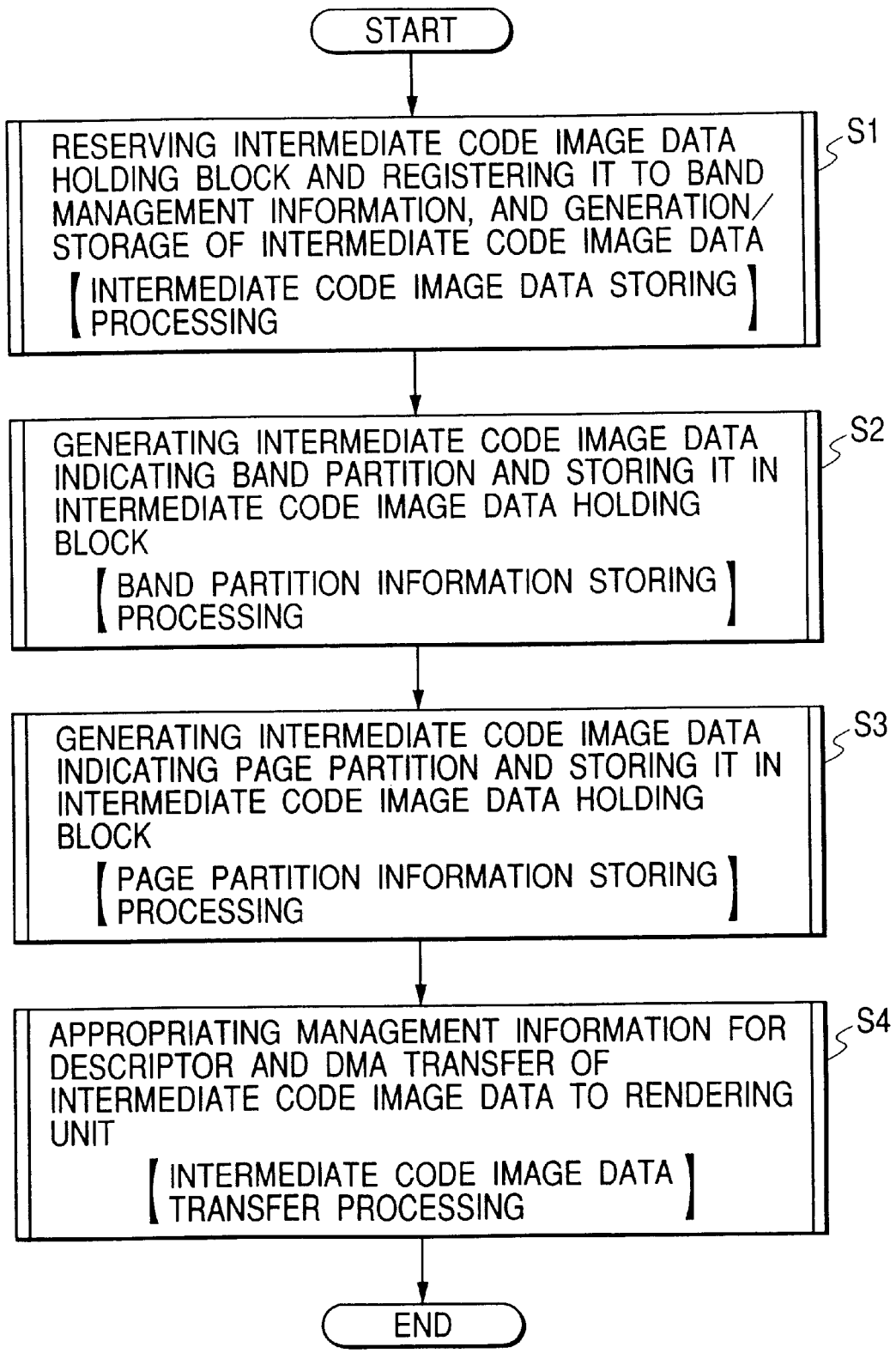
FIG. 5 is a chart to illustrate the basic operation sequence in the above embodiment.

FIG. 5 illustrates the basic operation sequence regarding the data storage into the memory 3 and the band transfer thereto in the image processing device A.

First, the intermediate code image data holding block is reserved to be registered in the band management information, and the intermediate code image data is generated to be stored in the holding block (S1: this processing is referred to as the "intermediate code image data storing processing"). Next, the intermediate code image data indicating the partitions of the bands is generated, which is stored in the intermediate code image data holding block (S2: this processing is named as the "band partition information storing processing"). Then, the intermediate code image data indicating the partitions of the pages is generated, which is stored in the intermediate code image data holding block (S3: this processing is referred to as the "page partition information storing processing"). And, the management information is appropriated as a descriptor of the DMA transfer management information, and this descriptor is supplied to the DMA controller 4, whereby the intermediate code image data is sequentially read and the DMA transfer processing is executed to the rendering unit 5 (S4: this processing is referred to as the "intermediate code image data transfer processing").

The processing of the steps S1 through S4 will now be discussed. Here, the first embodiment does not assume the double face printing.

1.2.2. Intermediate Code Image Data Storing Processing

The aforementioned intermediate code image data storing processing will be explained with reference to the flowchart shown in FIG. 6.

First, the input image information is interpreted (S100) and whether it is a plotting object or not is judged (S101). Since this processing assumes single face printing, if it is not a plotting object, the processing advances to step S102 and S103, where it is checked whether the information here contains input image information or not. If it is judged that the information contains input image information at step S103, the processing returns to step S100 to repeat the processing; and if it is judged that it does not contain input image information, the processing finishes this routine, transferring to the band partition information storing processing shown in FIG. 7.

On the other hand, if it is judged to be a plotting object at step S101, intermediate code image data is generated (S106). And, whether or not an intermediate code image data holding block is present on the memory 3 is judged by the band information of the corresponding band shown in FIG.

13, as will be mentioned later (S107). If this holding block is judged to be present on the memory 3, it is judged whether or not a storage area (vacant area) is present in this block (S108).

In this case, the judgment as to the presence of the storage area in the intermediate code image data holding block is made by referring to a value recorded in the management information Mic or the management information MIc. If a storage area is present and the data is stored therein, the value of the management information Mic or the management information Mic is updated (the same in the explanation of the following operation flow).

If the storage area is judged to be present at the above step S108, the intermediate code image data is stored (S109) and the data quantity of the intermediate code image data is recorded in the management information Mic or the management information MIc, and the processing is repeated from step S100.

Figure 10:
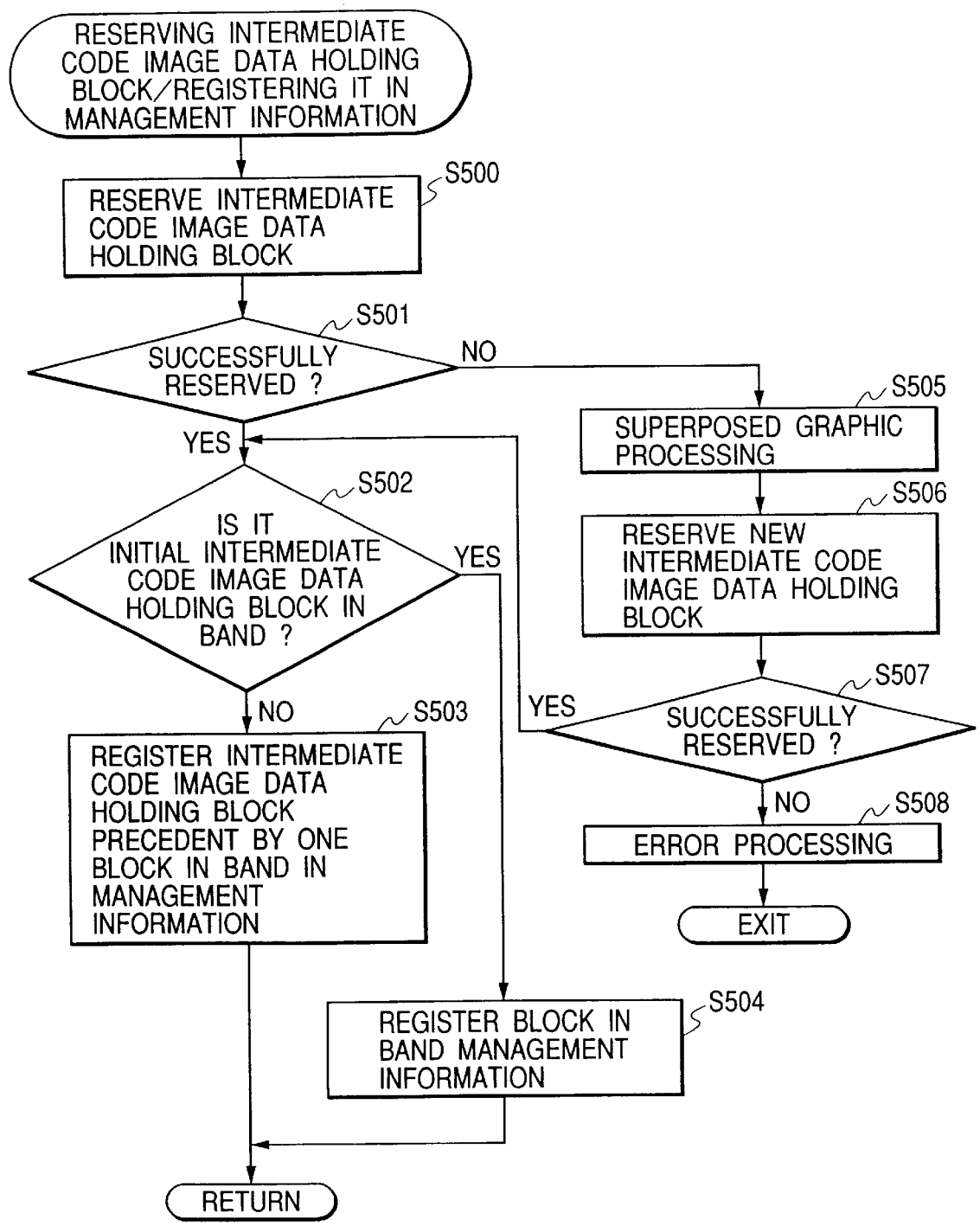
FIG. 10 is a flowchart to illustrate the reserve processing of the intermediate code image data holding blocks and the register processing of the above blocks to the management information, which are the subroutine of the above embodiment.
Figure 11:
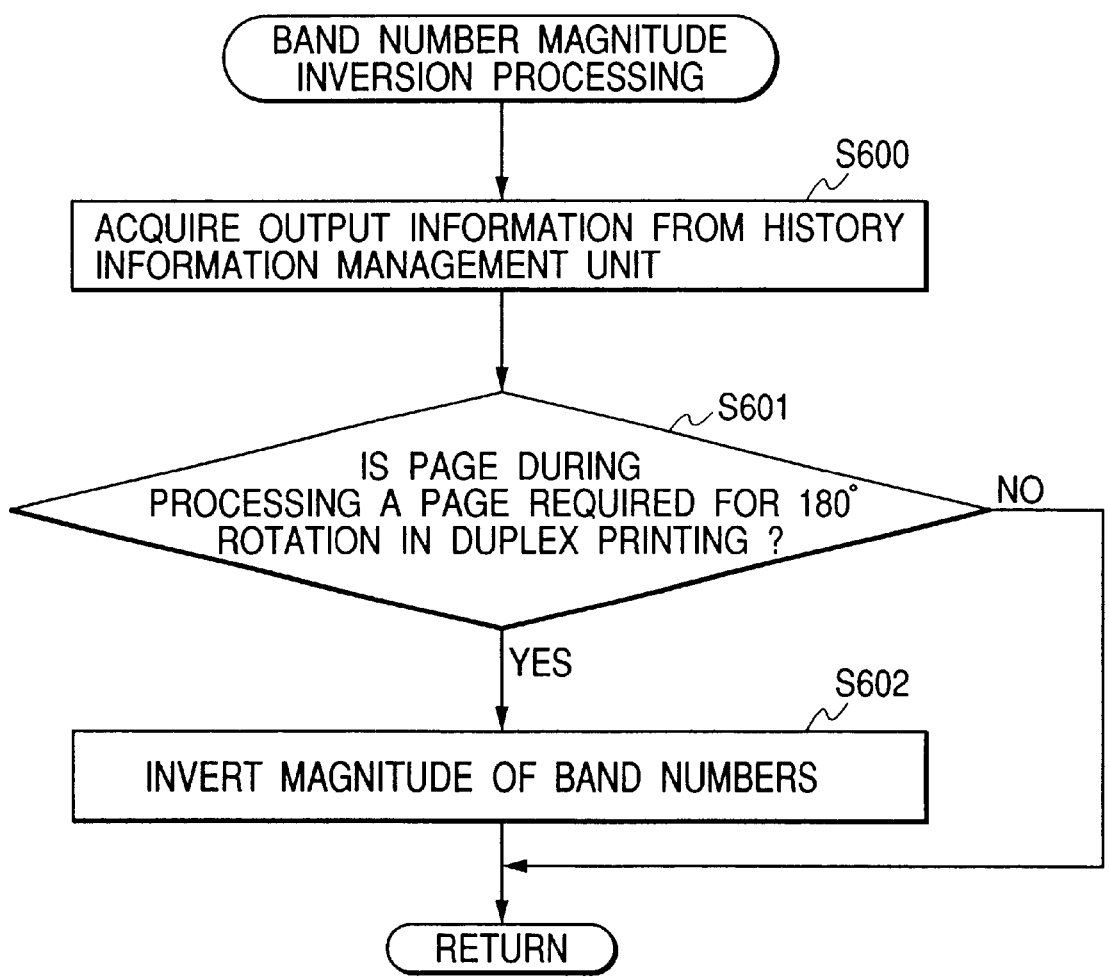
FIG. 11 is a flowchart to illustrate the band number magnitude inversion processing, being the subroutine of the above embodiment.

If the holding block is judged not to be present at the above step S107, or if the storage area is judged not to be present at the above step S108, an intermediate code image data holding block is reserved to be registered in the management information (S110) (this register processing will be detailed referring to FIG. 10). And, the intermediate code image data is stored in the holding block reserved by this processing (S109), the data quantity of the intermediate code image data is recorded in the management information Mic or the management information MIc, and the processing is repeated from step S100.

To sum up the foregoing flow, (1) in the initial plotting object, the processing is executed in the order of generating the intermediate code image data (S106), reserving the intermediate code image data holding block and registering it in the management information (S110), and storing the intermediate code image data (S109). (2) Further, in the plotting objects after the second, the processing is executed in theory in the order of generating the intermediate code image data (S106), and then storing the intermediate code image data (S109). (3) However, if the intermediate code image data holding block is used up, or if the storage area is used up even though the holding block is present, after reserving the intermediate code image data holding block and registering it in the management information (S110), the intermediate code image data is stored (S109). (4) And when all the objects are accepted, this routine is completed.

Thus, the intermediate code image data is stored in the intermediate code image data holding block and registered in the management information. And, in a data configuration shown in FIG. 13, the intermediate code image data holding blocks are linked up with each other.

Figure 13:
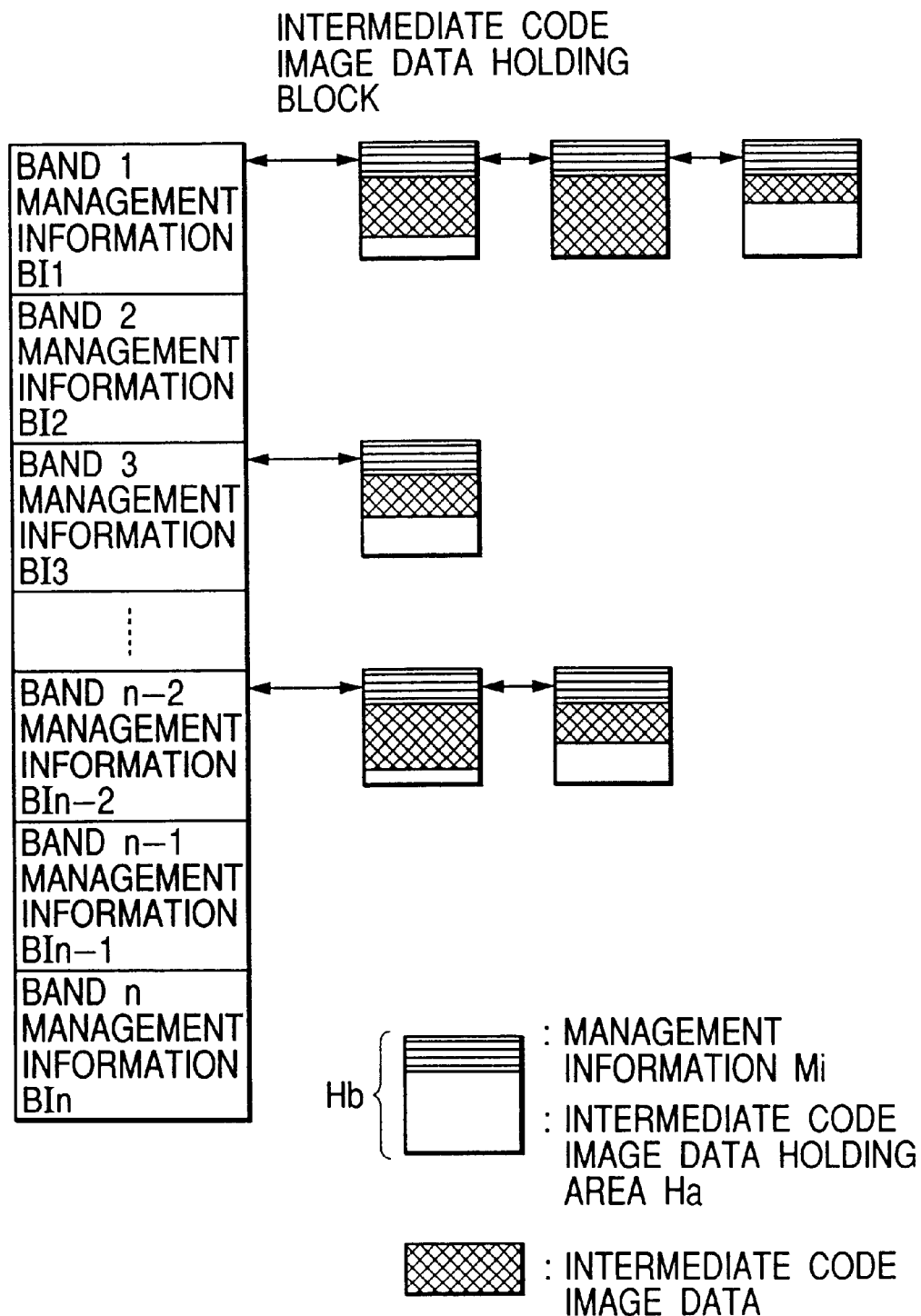
FIG. 13 is a chart to illustrate a configuration when the intermediate code image data holding blocks are linked in unit of band, in the above embodiment.

FIG. 13 illustrates a data configuration when the intermediate code image data holding blocks are controlled.

In the drawing, each of the band management information BI (BI1, BI2, . . . , Bin) holds the leading address of the intermediate code image data holding blocks in the concerned band (the same as to the band management information in FIG. 14 through FIG. 17). And, by knowing whether the address is zero (or NULL) or not, it becomes possible to determine whether there is a plotting object in the band or not, namely, whether there is the first intermediate code image data holding block or not.

And, as shown in FIG. 13, since the intermediate code image data holding block is configured not to be allocated to the band (band 2, band n−1, band n), the efficiency in use of the intermediate code image data holding block on the memory map is enhanced.

And, in case the intermediate code image data cannot be stored in one intermediate code image data holding block, as in the cases of the band 1 and band n−2 shown in FIG. 13, the intermediate code image data holding block management unit 2 reserves new intermediate code image data holding blocks from the memory 3, and stores the intermediate code image data by dividing it into multiple pieces of the intermediate code image data holding blocks. And, in order to show that the intermediate code image data pieces thus divided and stored form one set of data, the data is linked up with each other by the management information of each holding blocks.

Figure 14:
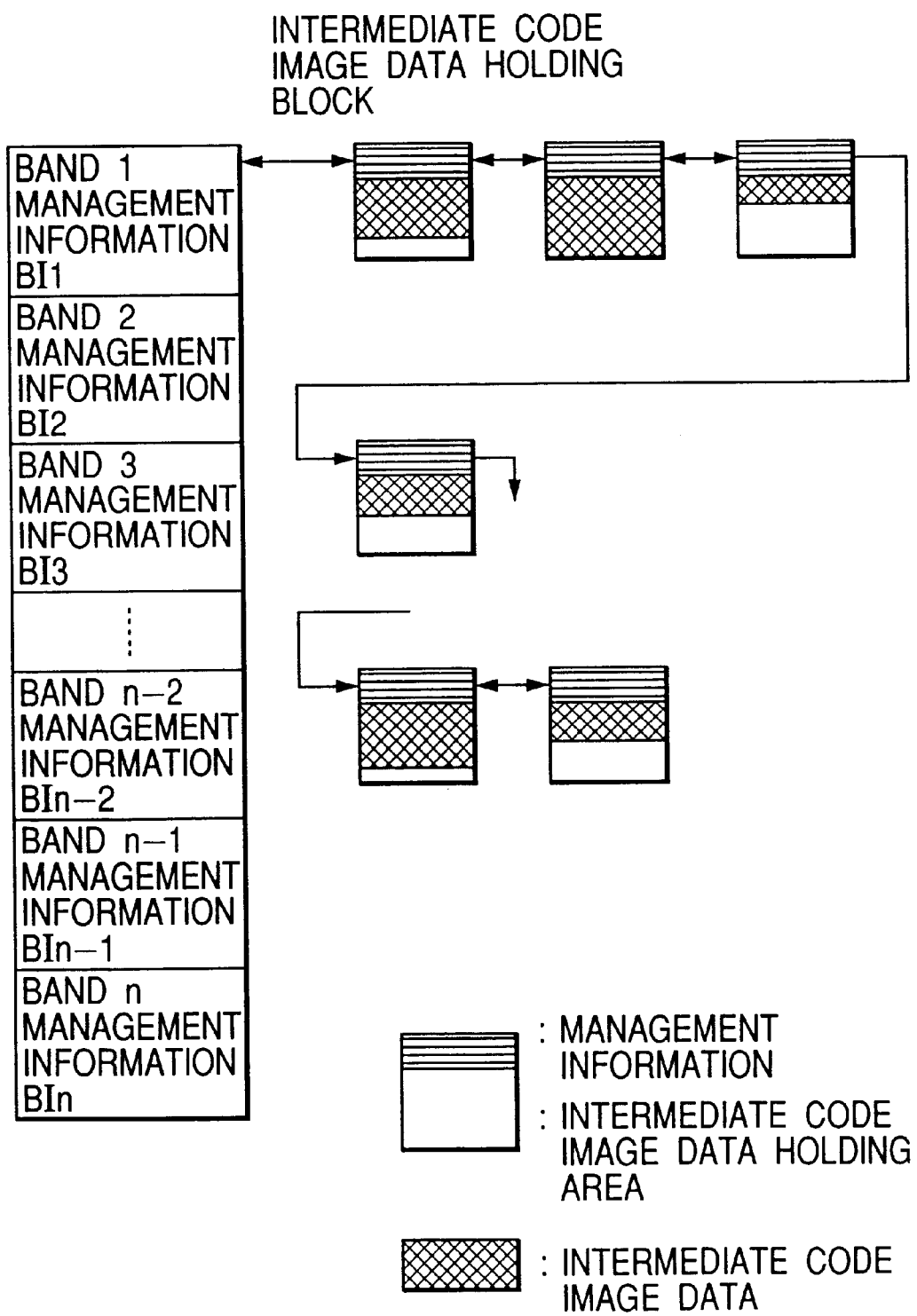
FIG. 14 is a configuration chart to illustrate a linked state of the intermediate code image data holding blocks immediately before starting the DMA when transferring the DMA in unit of page, in the above embodiment.

On the other hand, FIG. 14 illustrates a linked mode of the intermediate code image data holding blocks when starting the DMA in unit of page.

And, in addition to the data linkage in unit of band as shown in FIG. 13, the last intermediate code image data holding block in the band is linked with the leading intermediate code image data holding block in the following band. Therefore, it is possible to trace the linkage sequentially from the leading intermediate code image data holding block in a page toward the last intermediate code image data holding block in the page. Although the intermediate code image data holding blocks are controlled always in unit of band in the intermediate code image data storing processing, this linkage allows to start the DMA in unit of page.

1.2.2.1. Reserving the Intermediate Code Image Data Holding Blocks and Registering in the Management Information Next, the reservation of the intermediate code image data holding blocks indicating the contents of step S110 in FIG. 6 and the registration of the holding blocks in the management information will be explained with reference to the flowchart shown in FIG. 10.

First, an intermediate code image data holding block is reserved (S500). If the intermediate code image data holding block is successfully reserved, whether or not it is the initial intermediate code image data holding block in the band is judged (S502).

In case of the initial intermediate code image data holding block in the band, and in case of the integral configuration shown in FIG. 3, NUlls are set in the components Mia, Mib, Mid of the management information Mi, and the management information size is set in the component Mic of the management information Mi. In case of the discrete configuration shown in FIG. 4, the leading address to the reserved holding block is recorded in the management information MId.

And, this leading address of the intermediate code image data holding block is set in the band management information BI of the corresponding band, finishing this routine (S502→S504).

On the other hand, if it is judged that it is not the initial intermediate code image data holding block in the band at step S502, the holding block is registered in the management information as follows.

In case of the integral configuration shown in FIG. 3, the leading address of the reserved holding block is recorded in the management information Mia in the intermediate code image data holding block which is precedent by one block to a certain block in the band, further the leading address of the intermediate code image data holding block precedent by one block in the band is recorded in the management information Mib in the reserved holding block, and the size of the management information is recorded in the management information Mic of this holding block.

In case of the discrete configuration shown in FIG. 4, the leading address of the area that stores the management information corresponding to the reserved holding block is recorded in the management information MIa corresponding to the intermediate code image data holding block precedent by one block in the band, further the leading address of the own block is recorded in the management information MId corresponding to the reserved holding block, and the leading address of the management information area corresponding to the intermediate code image data holding block precedent by one block is recorded in the management information MIb corresponding to the own block.

If it is judged, at step S501, that the intermediate code image data holding block is not successfully reserved, the superposed graphic processing is executed (S505). The superposed graphic processing, as disclosed in the Japanese Published Unexamined Patent Application No. Hei 10-177657 by the applicant, is to reduce the image data quantity by unifying overlapped graphics between the plotting objects when the intermediate code image data is generated in abundance due to presence of gradation graphics, etc. and the intermediate code image data holding blocks are insufficient. In the superposed graphic processing, it becomes possible to eliminate the overlapped parts between the plotting objects to thereby reduce the quantity of the intermediate code image data, to free the intermediate code image data holding block areas left over on the memory, and to reuse them.

After executing the superposed graphic processing, an intermediate code image data holding block is reserved afresh (S506). If it is successful, the processing is transferred to the steps after S502 (S507→S502); and if unsuccessful, an appropriate error processing is executed (S507→S508), finishing the whole processing.

1.2.3. Band Partition information Storing Processing

The total quantity intermediate code image data of the intermediate code image data holding area Ha or the intermediate code image data holding block HB is transferred to the rendering unit 5 by band or by page, and during the rendering processing, it becomes impossible to discriminate the band partition and the page partition. Accordingly, an intermediate code image data format indicating the band partition and an intermediate code image data format indicating the page partition are adopted afresh. Of these, the processing to store the intermediate code image data indicating the band partition will be explained with the flowchart shown in FIG. 7.

First, in case that the output device is a runaway type printer (for example, laser printer), a void judgment is executed (S200→S201). In this void judgment processing, before starting the rendering mechanism, checking is performed by band as to whether or not the speed of generating the bit map data into the band buffers exceeds the printing speed.

As a method for this check, a comparison is made between the printing speed in unit of band and the total of the readout time acquired from the total byte number of the intermediate code image data generated in one band, the write time acquired from the total byte number (more accurate if write position is considered) written in the band buffers, and the time to clear the band buffers. If this check finds that there is not an overrun error in all the bands, or if the output device is a non-runaway type printer (for example, ink jet printer), the processing is transferred to the steps after S204.

If the output device is a non-runaway type printer, intermediate code image data indicating the band partition is immediately generated (S204), and it is judged whether or not the intermediate code image data holding block is present on the memory (S205). If the holding block and the storage area are present, the intermediate code image data indicating the band partition is stored in this holding block (S205→S206→S209).

On the other hand, if the intermediate code image data holding block is judged not to be present at step S205, it is judged whether or not the intermediate code image data holding block precedent by one block can store the intermediate code image data indicating the band partition. If the intermediate code image data holding block precedent by one block is judged to be incapable of storing the data, whether or not the intermediate code image data holding block precedent by two blocks can store the data is judged. Likewise, it is sequentially judged whether or not the precedent intermediate code image data holding block can store the intermediate code image data indicating the band partition (S207).

If it is judged to be capable of storing at step S207, the intermediate code image data holding block in that band stores the intermediate code image data indicating the band partition (S209).

If it is judged to be incapable of storing at step S207, or if the storage area is judged not to be present at step S206, the process of reserving the intermediate code image data holding block and registering the block in the management information, which is already shown in FIG. 10, is executed (S208).

If the intermediate code image data indicating the band partition is stored at step S209, it is judged whether or not a band subsequent to the band that is being processed is the final (S210). If it is the final band, the routine is completed; and if it is not the final, the processing repeats the steps after step S204. By the judgment at step S210, the intermediate code image data indicating the band partition is not needed to be stored in the final band.

Figure 15A:
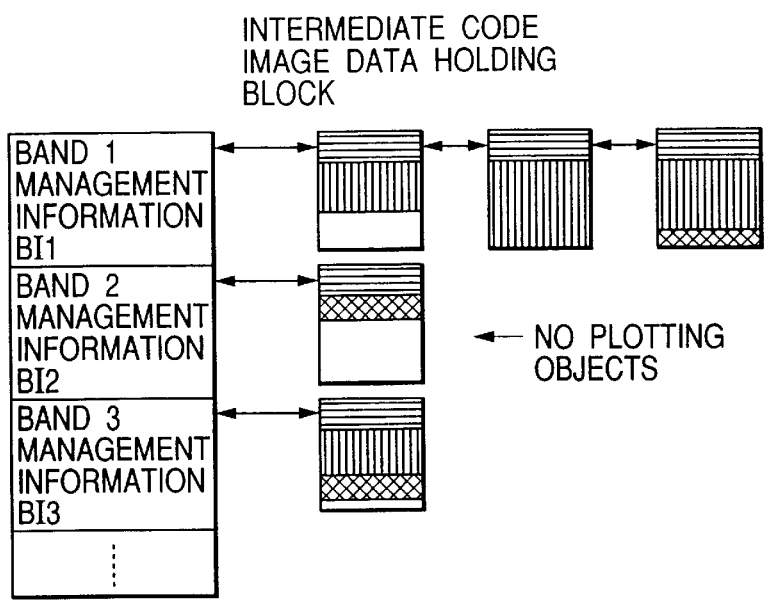
FIGS. 15A and 15B are charts to illustrate an example in which the intermediate code image data showing the band partition is used and an example in which the above data is retained, in the above embodiment.
Figure 15B:
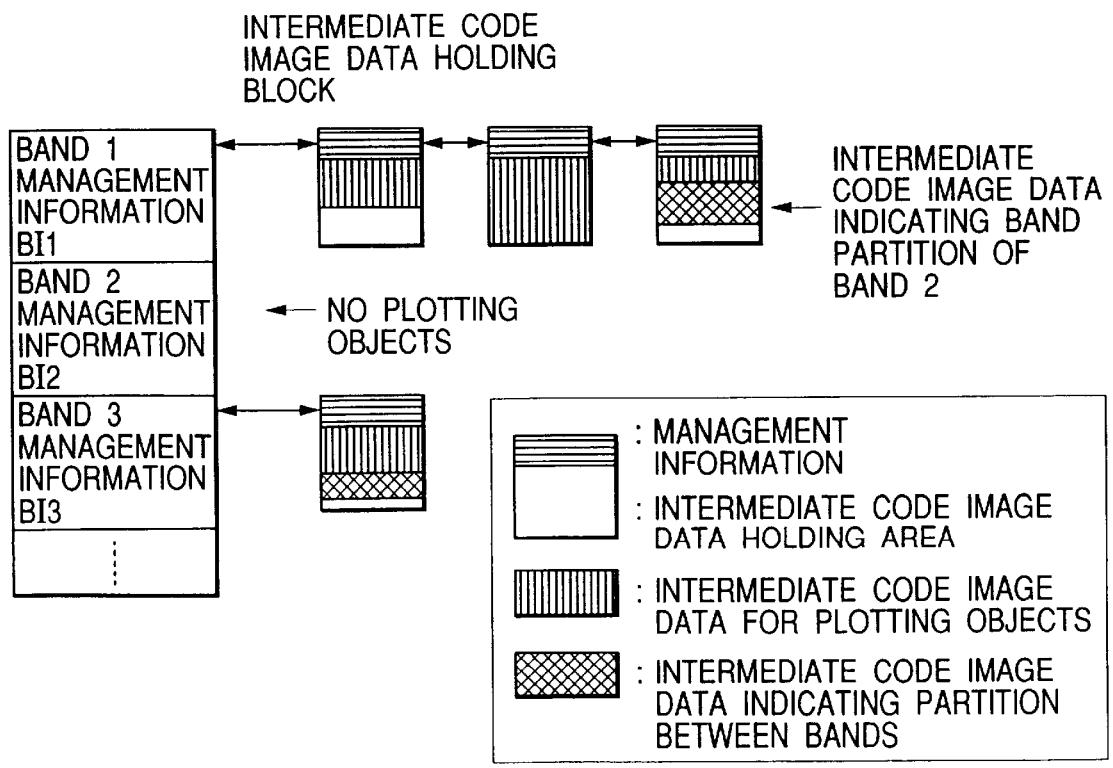
Figure 16A:
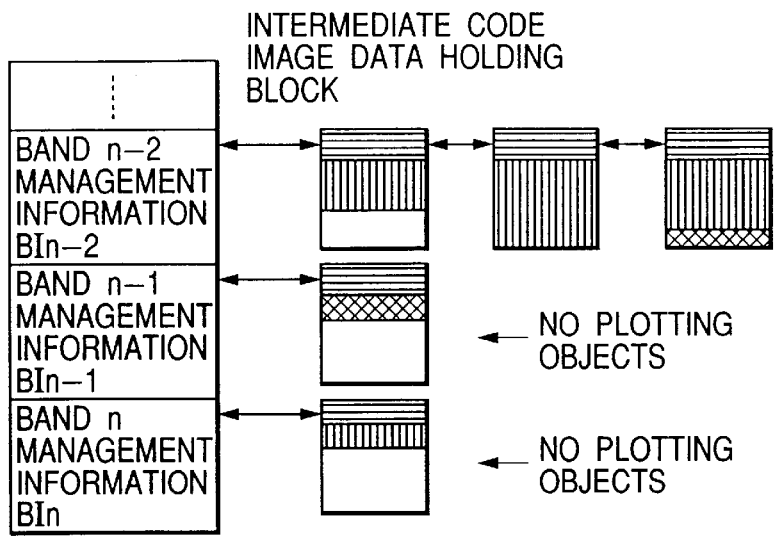
FIGS. 16A and 16B are charts to illustrate an example in which the intermediate code image data showing the page partition is used and an example in which the above data is retained, in the above embodiment.
Figure 16B:
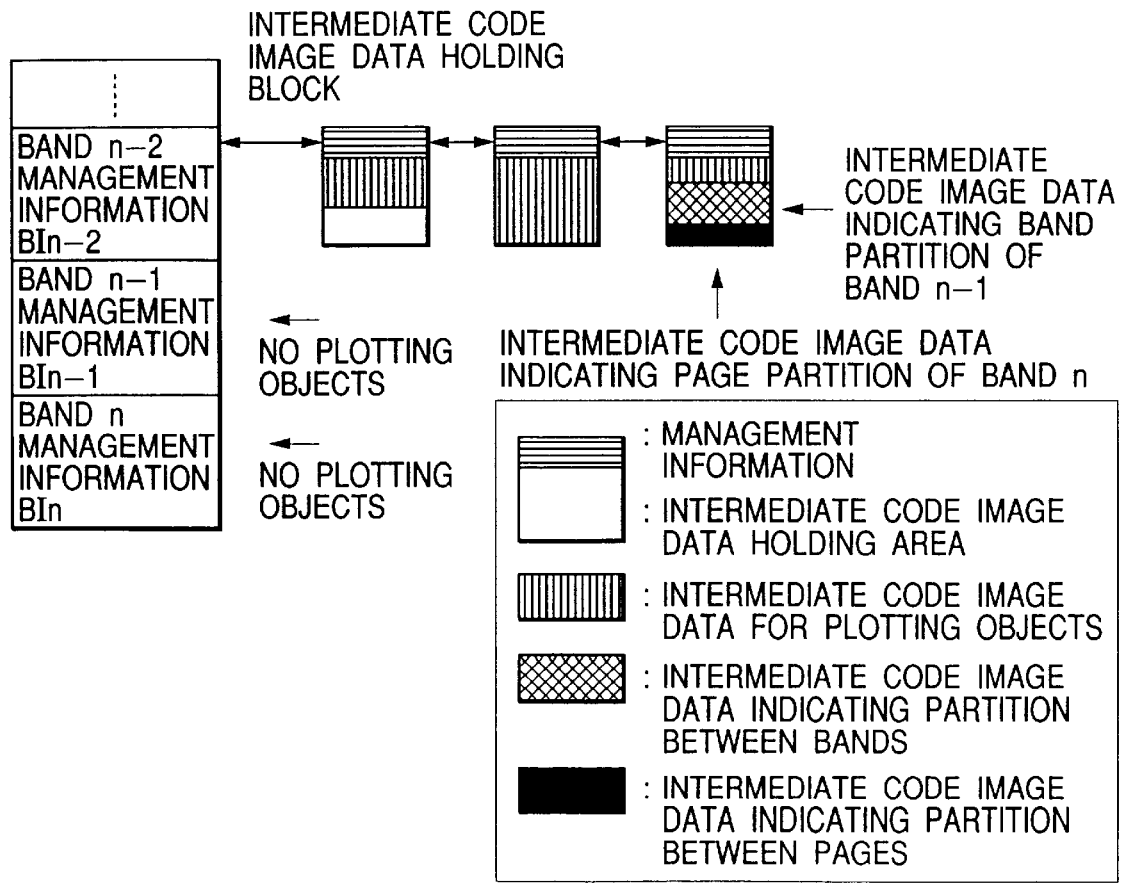

FIGS. 15A and 15B typically illustrate a state in which this band partition information is stored in the intermediate code image data holding block. Principally, as shown in FIGS. 15A and 15B, the intermediate code image data indicating the band partition is stored in the tail of the final intermediate code image data holding block in each band.

In FIG. 15A, although there does not exist a plotting object in the band 2, the intermediate code image data holding block is reserved, and the intermediate code image data indicating the band partition is stored after the management information in this holding block. Usually, the size of the intermediate code image data holding block is several k bytes, though it depends on the band partition number, and in contrast to this, the size of the intermediate code image data indicating the band partition is several bytes. Accordingly, if the intermediate code image data holding block is reserved when there is not a plotting object and the intermediate code image data indicating the band partition is stored in this holding block, it will extremely deteriorate the efficiency of the holding block in use.

Accordingly, as shown in FIG. 15B, the intermediate code image data holding block is not reserved as to the band 2 that does not have a plotting object, and the intermediate code image data indicating the partition of the band 2 is made to be stored in the last intermediate code image data holding block in the band 1.

In this manner, according to the method of holding the intermediate code image data, the intermediate code image data holding blocks having the same size are used, and the intermediate code image data holding block is not supplied to the band that does not contain a plotting object. Further, the intermediate code image data indicating the partition between the bands is made to be stored in the last intermediate code image data holding block of the band having the plotting objects, for the band not having a plotting object.

1.2.4. Page Partition information Storing Processing

Figure 8:
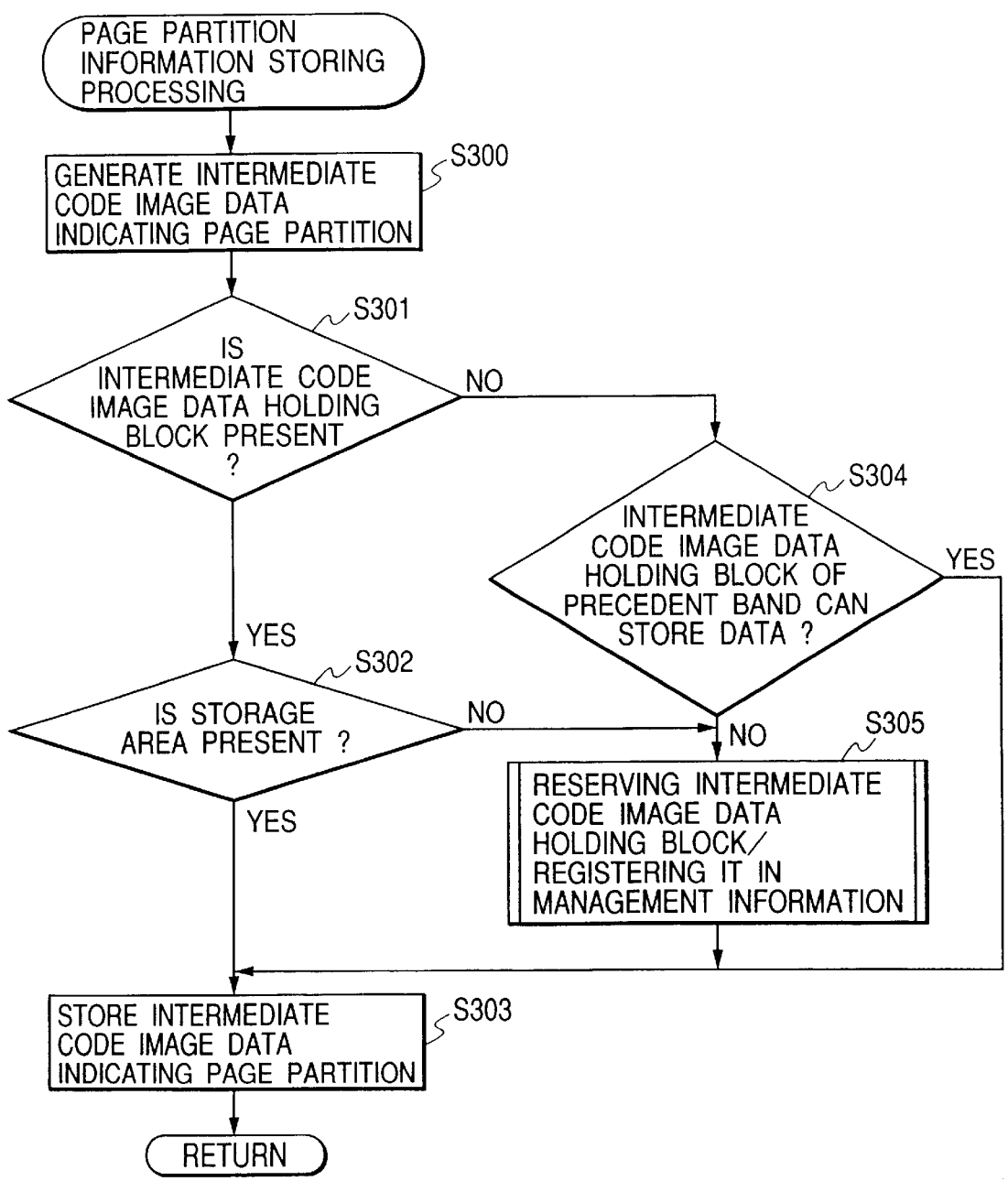
FIG. 8 is a flowchart to illustrate the page partition information storing processing in the above embodiment.

The page partition information storing processing will be explained referring to the flowchart shown in FIG. 8.

First, intermediate code image data indicating the page partition is generated in the final band (S300). And, whether or not an intermediate code image data holding block is present (a plotting object is present) in the final band is judged (S301).

If an intermediate code image data holding block is judged to be present, whether a storage area is present in the holding block or not is judged (S302). If the storage area is judged to be present, the intermediate code image data indicating the page partition is stored (S303); and if the storage area is judged not to be present, the process of reserving the intermediate code image data holding block and registering the block in the management information, which is already shown in FIG. 10, is executed (S305), and the intermediate code image data indicating the page partition is stored in the reserved holding block (S303).

Figure 7:
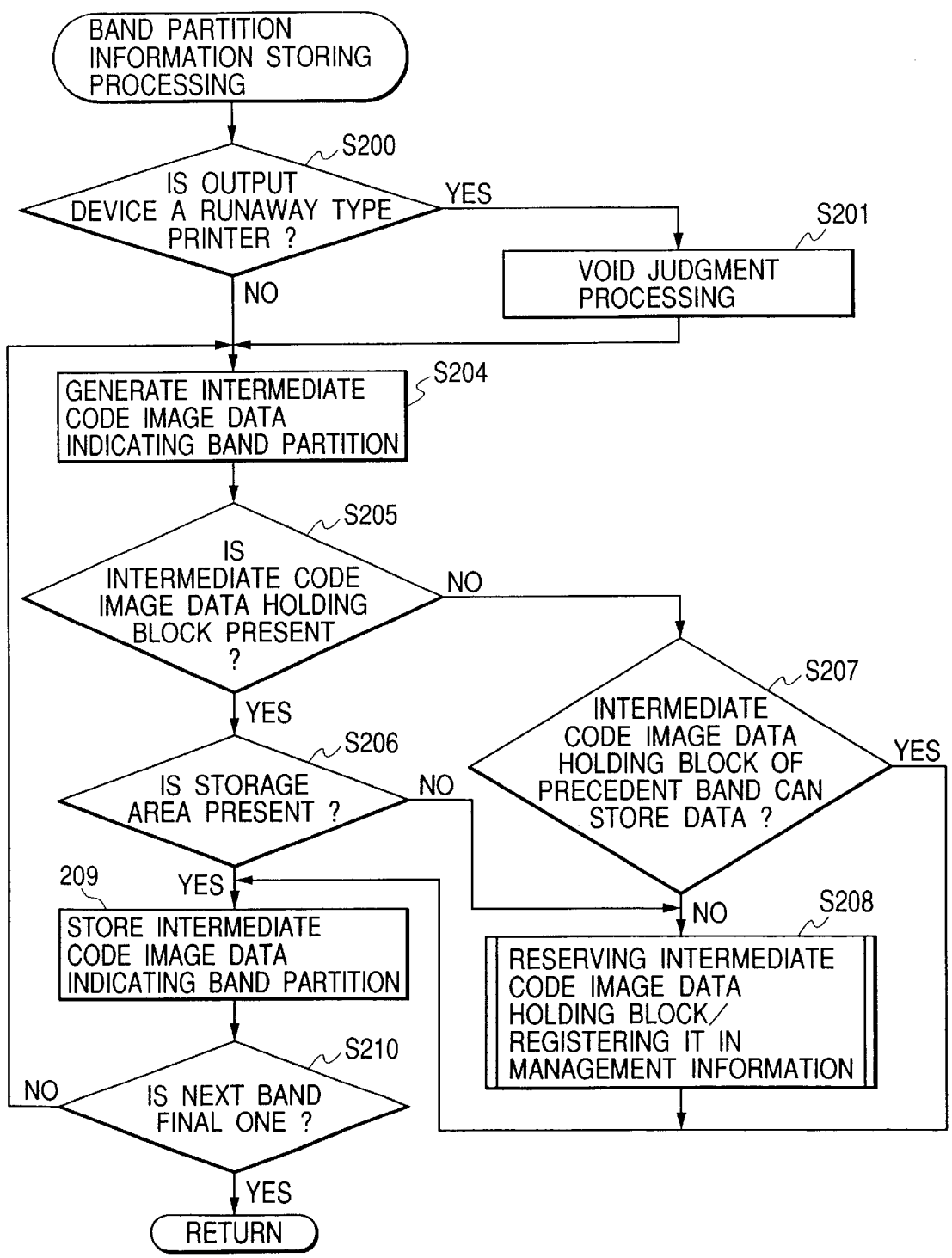
FIG. 7 is a flowchart to illustrate the band partition information storing processing in the above embodiment.

On the other hand, if the intermediate code image data holding block is judged not to be present, in the same manner as in step S207 in FIG. 7, it is sequentially judged whether or not the data can be stored in the intermediate code image data holding block in the previous band (S304). If it is judged that the data can be stored in the holding block, the intermediate code image data indicating the page partition is stored therein; and if it is judged that the data cannot be stored, the process of reserving the intermediate code image data holding block and registering the block in the management information is executed (S305), and the data is stored in the reserved holding block (S303).

By means of the foregoing processing, the intermediate code image data, management information, band partition information, and page partition information are stored in order, and by utilizing the management information, it becomes possible to implement high speed DMA transfer of the intermediate code image data to the rendering unit 5.

1.2.5. Intermediate Code Image Data Transfer Processing

The intermediate code image data transfer processing will be explained referring to the flowchart shown in FIG. 9.

First, the management information in all the intermediate code image data holding blocks is rewritten into the descriptors (S400). And, it is judged whether the DMA transfer by each page is executed or not (S401).

If the DMA transfer is executed by page, the descriptors to the intermediate code image data holding blocks are linked among the different bands (S401→S402), as shown in FIG. 14. Further, initialization and setting of the DMA controller 4 are executed (S403), the DMA is started (S404), and the DMA transfer is continued till its end (S405→S406→S405 . . . ).

On the other hand, in case of the DMA transfer by band, first the DMA controller 4 is initialized (S407), next the DMA controller 4 is set up (S408), and then the DMA transfer is executed (S410→S411→S410→ . . . And, if there are bands not transferred, the processing after step S408 is repeated.

In this manner, all the management information is rewritten into the descriptors by the intermediate code image data holding block management unit 2, and the DMA controller 4 is initialized, set up, and started; and thereby, the descriptors after the second can be acquired by the DMA controller 4 sequentially from the intermediate code image data holding block area.

In the case of the integral configuration, the sum of the management information size and the total intermediate code image data quantity, which are set in the management information Mic, is rewritten into the total intermediate code image data quantity, and the total intermediate code image data quantity contained in the intermediate code image data holding area Ha designated by each descriptor is DMA-transferred to the rendering unit 5. On the other hand, in the case of the discrete configuration, the intermediate code image data of the total intermediate code image data quantity contained in the intermediate code image data holding block HB designated by each descriptor, which is set in the management information MIc, is DMA-transferred to the rendering unit 5.

And, as the DMA transfer to the rendering unit 5 is completed as to the descriptor having a flag indicating the final descriptor set, the intermediate code image data transfer processing is terminated.

1.2.5.1. Processing for Utilizing the Management information as the Descriptor Next, the processing for rewriting the management information, which is shown in step S400 in FIG. 9, and utilizing it as the descriptor will be explained.

Since this embodiment aims at not the software rendering but the hardware rendering, it is necessary to supply the intermediate code image data holding blocks distributed on the memory efficiently to the rendering unit 5. Since the intermediate code image data holding blocks as the transfer objects are located to be dispersed on the memory, the intermediate code image data holding blocks can be supplied efficiently to the rendering unit 5 by employing the chained DMA control system that enables the transfer of discontinuous data by starting the DMA once.

To implement the chained DMA control, the descriptors retaining the information of transferred data are needed; and usually, the leading addresses of the transferred data, transferred quantity, and information as to the addresses of the descriptors of the next transferred data, etc., are needed.

In the configuration of the intermediate code image data holding blocks shown in FIG. 3 or FIG. 4, the intermediate code image data holding area Ha or the intermediate code image data holding block HB, which is the transfer object in the chained DMA control, retains management information to be paired.

In case of the integral configuration shown in FIG. 3, the management information Mia holding the pointer to the next intermediate code image data holding block is equivalent to the address to the descriptor of the next transferred data. And, the management information Mic holding the control size and the total intermediate code image data quantity is reduced to the data transfer quantity in the descriptor by subtracting the control size.

Therefore, the leading address to the intermediate code image data holding area Ha being the leading address to the transferred data is stored in the management information Mib area holding the pointer to the precedent intermediate code image data holding block, and the flag indicating whether the descriptor to the final intermediate code image data holding block or not is stored in the virgin management information Mid area.

This arrangement with the management information Mib, Mic, Mid allows to configure the descriptors to the intermediate code image data stored in the intermediate code image data holding blocks, and the chained DMA transfer will be implemented by using the descriptors.

On the other hand, in case of the discrete configuration shown in FIG. 4, the management information MIa holding the pointer to the next management information is equivalent to the address to the descriptor of the next transferred data, and the management information MIc holding the total intermediate code image data quantity is equivalent to the data transfer quantity in the descriptor. Further, the management information MId holding the pointer to the corresponding intermediate code image data holding block is equivalent to the leading address to the transferred data. And, the flag indicating whether the final descriptor or not is stored in the management information MIb holding the pointer to the precedent management information.

In short, the management information MIb, MIc, MId allows to configure the descriptors to the intermediate code image data stored in the intermediate code image data holding blocks, and the chained DMA transfer will be implemented by using the descriptors.

To sum up the aforementioned, whichever memory mapping configuration is adopted, the management information can easily be appropriated as the descriptor. Therefore, since it is not necessary to reserve a descriptor area afresh on the memory and set management information in the descriptor area, the setting of the descriptor can be implemented at higher speed.

Since the intermediate code image data holding blocks are controlled by band, as shown in FIG. 13, it becomes possible to start the chained DMA by band by rewriting the management information into the descriptors.

And, as shown in FIG. 14, the chained DMA in unit of page can be started by setting each of the descriptors so as to link the last block of the precedent band with the leading block of the following band at the partition between the bands.

In this case, compared with the chained DMA started in unit of band, the initialization setting and starting of the DMA by each band are not needed. Therefore, in the case of the output device being a runaway type printer, the accuracy of checking whether the speed of generating bit map data (raster data) exceeds the printing speed is enhanced, and the checking processing is finished in a shorter time, which enables the generation of raster data in real time.

Figure 12:
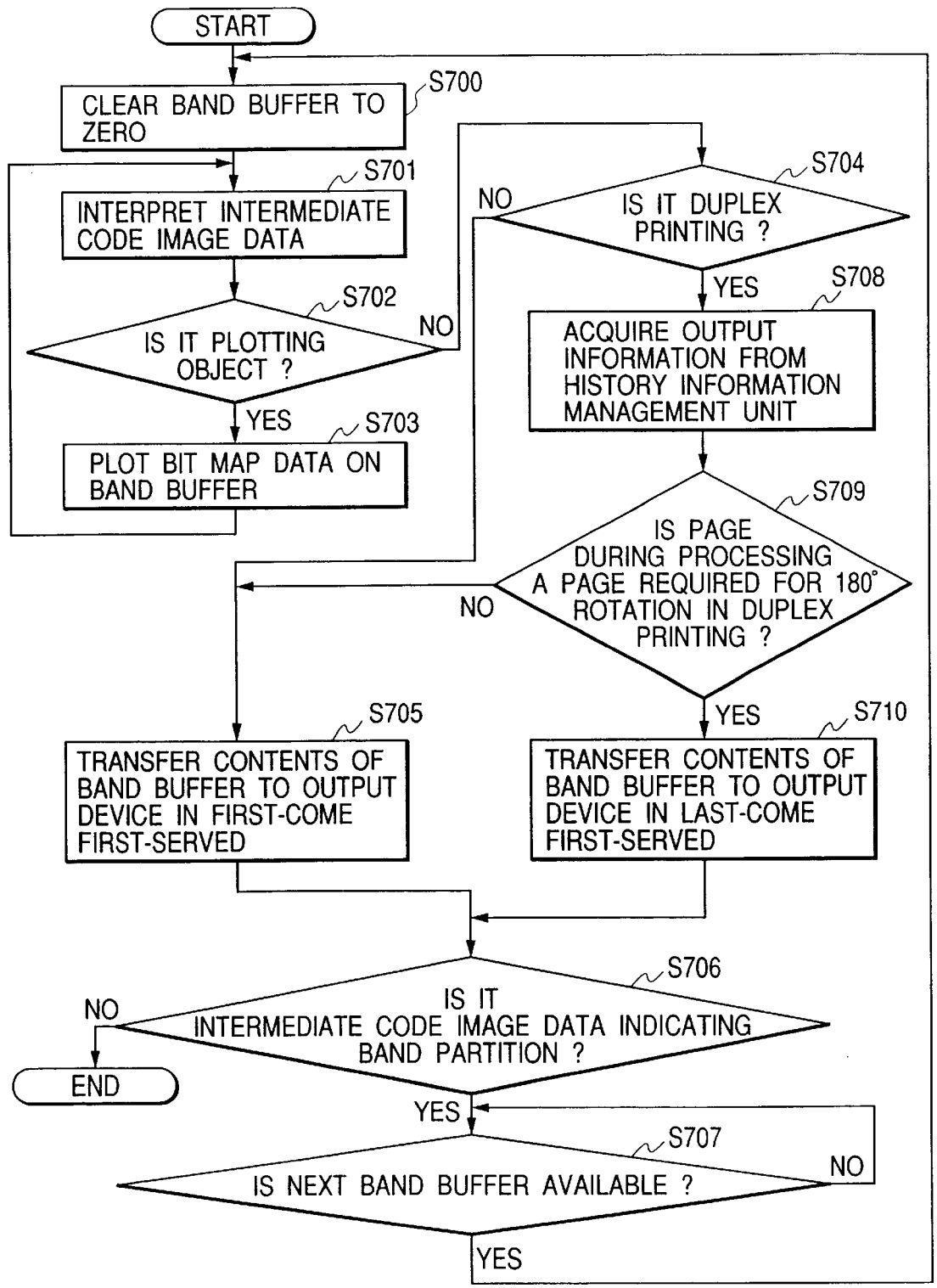
FIG. 12 is a flowchart to illustrate the output processing of the band buffer in the above embodiment.

1.2.6. Plotting Processing to the Band Buffers and Transfer Processing to the Output Device Thus, as the intermediate code image data by band is supplied to the rendering unit 5, the rasterized data is delivered to the output device in accordance with the flowchart shown in FIG. 12.

First, the band buffers 7 are cleared to zero (S700). Then, the intermediate code image data is interpreted (S701), and checking is performed as to whether the interpreted data includes a plotting object or not (S702). If the data is judged to include a plotting object, the intermediate code image data is expanded into the raster data, which is written into the band buffers 7 (the bit map data is plotted on the band buffers 7) (S703), and the processing returns to step S701 again to interpret the intermediate code image data (S701).

On the other hand, if the intermediate code image data interpreted at step S701 is judged not to be a plotting object but to be an intermediate code indicating the band partition or an intermediate code indicating the page partition (S702), the contents of the band buffers 7 are transferred to the output device (S705). And, if the data is judged not to be the intermediate code image data indicating the band partition, the processing is finished.

If the data is judged as the intermediate code image data indicating the band partition, whether the other band buffer is present or not is judged (S707). If it is present, the processing after step S700 is repeated, and the bit map data is plotted in this band buffer.

The rendering unit 5, by interpreting the intermediate code image data indicating the band partition, executes the initialization setting and starting of the band buffer read/write controller 6, and transfers the bit map data that is completed to be expanded into band buffers 7 to the output device. And, by interpreting the intermediate code image data indicating the page partition, the rendering unit 5 transfers the final bit map data to the output device, and terminates the rendering processing.

1.3. Effect of the Embodiment (1) In the case of the integral configuration shown in FIG. 3, the embodiment does not require the stock register disclosed in the second published application, since individual descriptors and transfer data exist in continuous areas on the memory map, and the descriptor holds the information relating to the following transfer data; and it does not have a system restriction that necessarily contains the PCI bus.

(2) In the case of the discrete configuration shown in FIG. 4, as disclosed in the second published application, the embodiment achieves the data transfer by the chained DMA control system, without making the continuous areas on the memory space possess the individual descriptors and transfer data.

(3) By reducing the management information in handling the intermediate code image data and the descriptor information in the DMA transfer to common information, the embodiment makes the reservation of the descriptor areas unnecessary after the transfer data is determined, and implements a high speed processing for setting the descriptors.

(4) By rewriting each of the descriptors so as to link the last intermediate code image data holding block of the precedent band with the leading intermediate code image data holding block of the following band at the partition between the bands, the embodiment allows to start the DMA in unit of page. Thus, compared with the DMA transfer executed in unit of page, the embodiment makes unnecessary the initialization setting and starting of the DMA by each band, and allows to transfer the data to the printer in real time even if the output device is a runaway type printer.

(5) In the hardware rendering mechanism, the embodiment enables rendering processing in unit of band and in unit of page, and it prevents the intermediate code image data holding blocks from being used in vain and the insufficiency of the holding blocks from occurring immediately before transferring raster data to the output device.

2. Second Embodiment 2.1. Configuration of the Embodiment

The image processing device B relating to the second embodiment stores the intermediate code image data in the memory and executes the DMA transfer of the data to the rendering unit 5 at high speed, so as to enhance the efficiency of the memory in use in case of double face printing.

Figure 2:
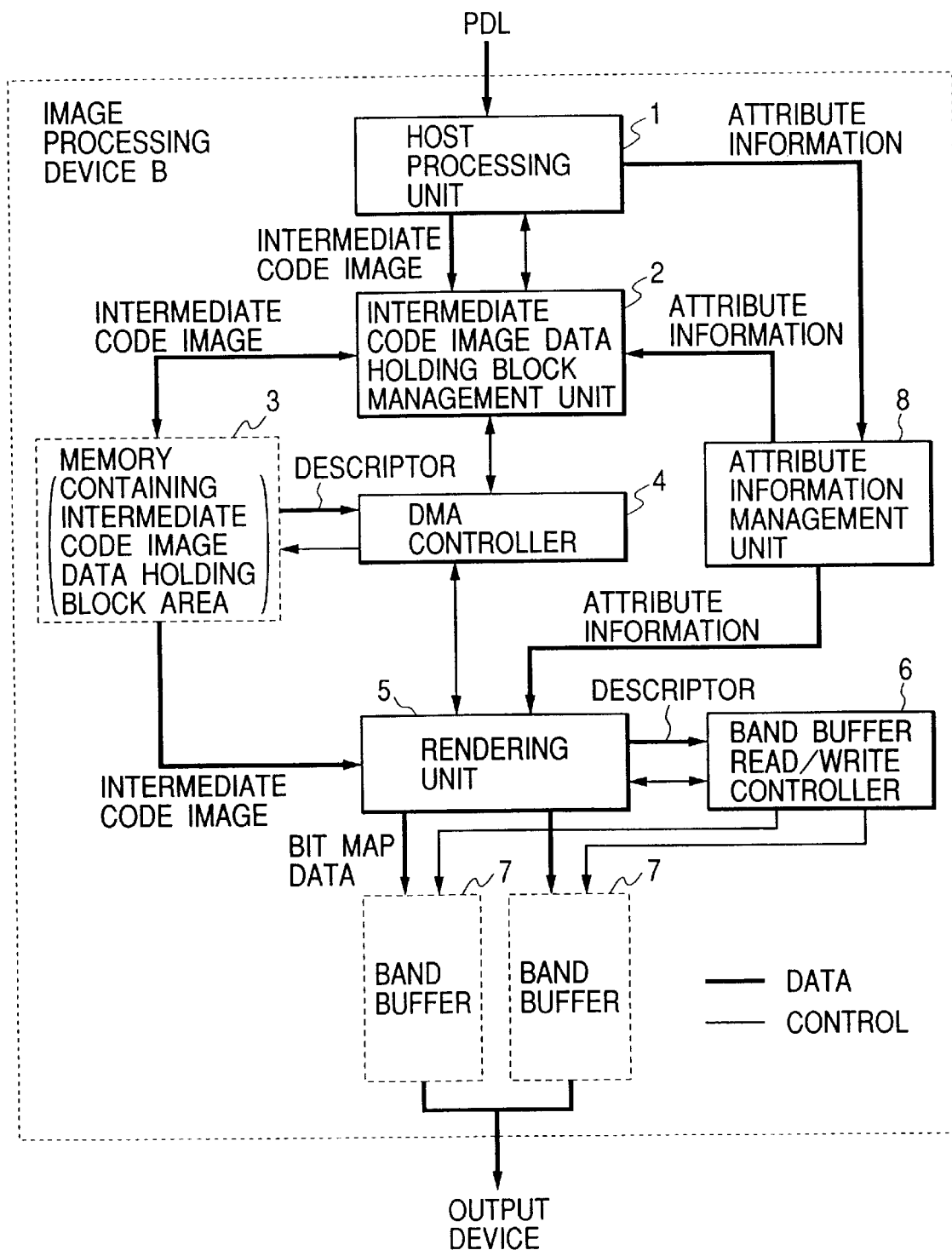
FIG. 2 is a block diagram of an image processing device B relating to the above embodiment.

The configuration of the image processing device B is illustrated in FIG. 2. It is substantially the same as the configuration of the image processing device A, and the difference in the configuration will be explained mainly.

The host processing unit 1 interprets the input management information as well as the PDL data, and if the host information includes the instruction of output, the host processing unit 1 informs of this output information to an attribute information management unit 8. This output information includes the information relating to the instruction of output, such as either of Simplex (single face printing) or Duplex (double face printing), and in the case of Duplex, necessity of the image rotation by 180° during outputting the image for the rear face. The attribute information management unit 8 supplies this output information to the intermediate code image data holding block management unit 2 and the rendering unit 5.

The intermediate code image data holding block management unit 2 looks up the contents of the output information while rewriting the management information into the descriptor; if the information includes the instruction of Duplex and image creation for the rear page, the image processing device B reserves the intermediate code image data holding blocks from the band having a larger band number in reverse to the case of the image processing device A, and it stores the intermediate code image data indicating the band partition or the intermediate code image data indicating the page partition in those blocks.

And, in case of starting the chained DMA in unit of page, the direction of block linkage is inverted at the band partition. For example, as shown in FIG. 17, the linkage starting at the intermediate code image data holding block in the band n as the leading block is spread over to the first intermediate code image data holding block, to the second intermediate code image data holding block, and to the third intermediate code image data holding block in the band n−2, and is further spread to the intermediate code image data holding blocks contained in the bands after the band n−3.

Further, during transferring the bit map data expanded on the band buffers 7 to the external device, if the content of output information is Duplex, and an image for the rear page required for the 180° rotation, the rendering unit 5 sets up the DMA controller 4 so as to read the bit map data in the descending order of the address number, and starts the DMA.

Figure 17:
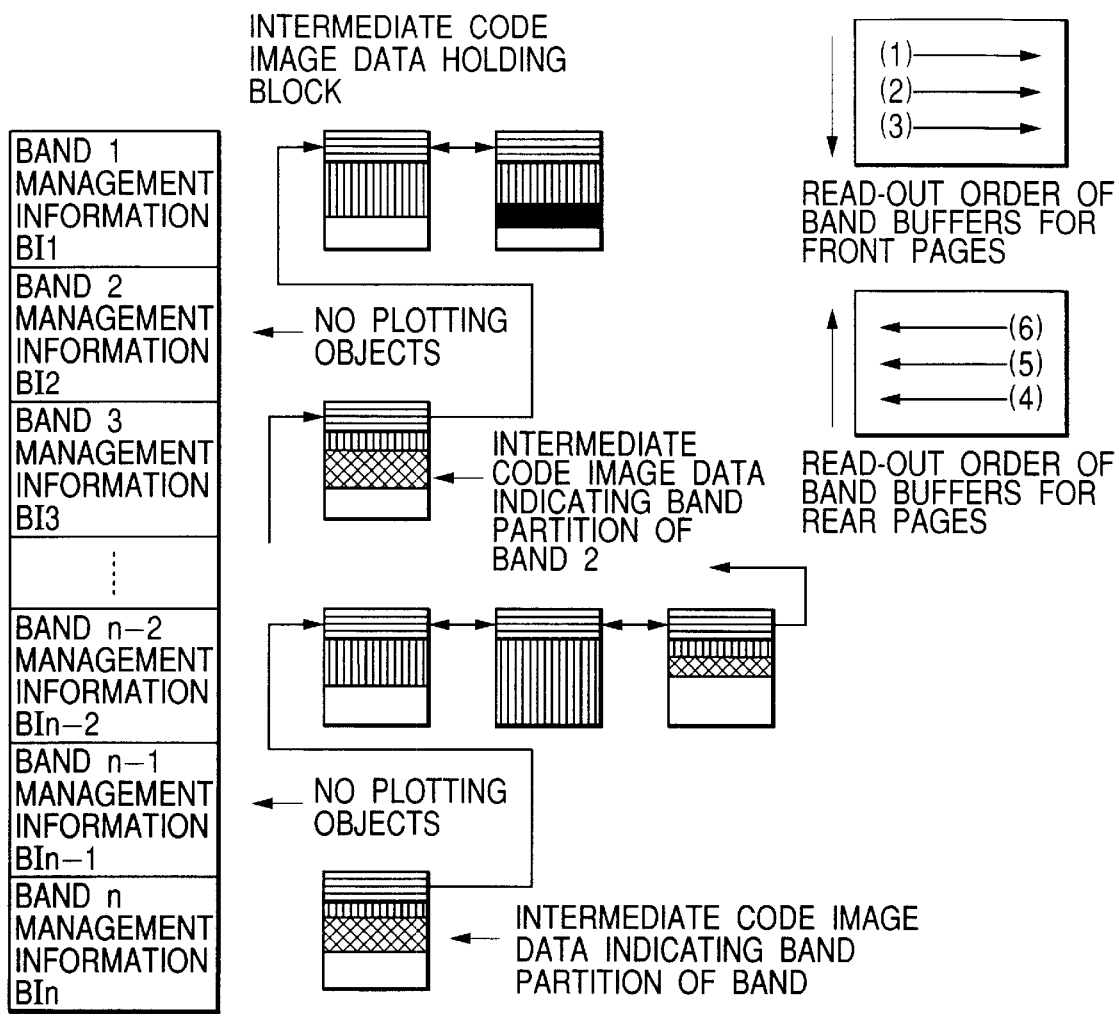
FIG. 17 is a configuration chart to illustrate a managed state of the intermediate code image data holding blocks in case of starting the DMA in unit of page, when making the rear image for double face printing, in the above embodiment.

Concretely, as shown in FIG. 17, the readout of the band buffers 7 in the front page is performed in the order of (1)→(2)→(3) from the upper left in unit of line, and on the contrary, the readout of the band buffers 7 in the rear page is performed in the order of (4)→(5)→(6) from the lower right in unit of line.

Thus, in case of instructing Duplex, the embodiment facilitates the matching with the 180° rotation required for rear face printing.

2.2. Operation of the Embodiment

The basic operation sequence is the same as in the first embodiment, as shown in FIG. 5.

Accordingly, the same operations as mentioned in the first embodiment will be omitted, the operations proper to double face printing will be explained mainly.

Figure 6:
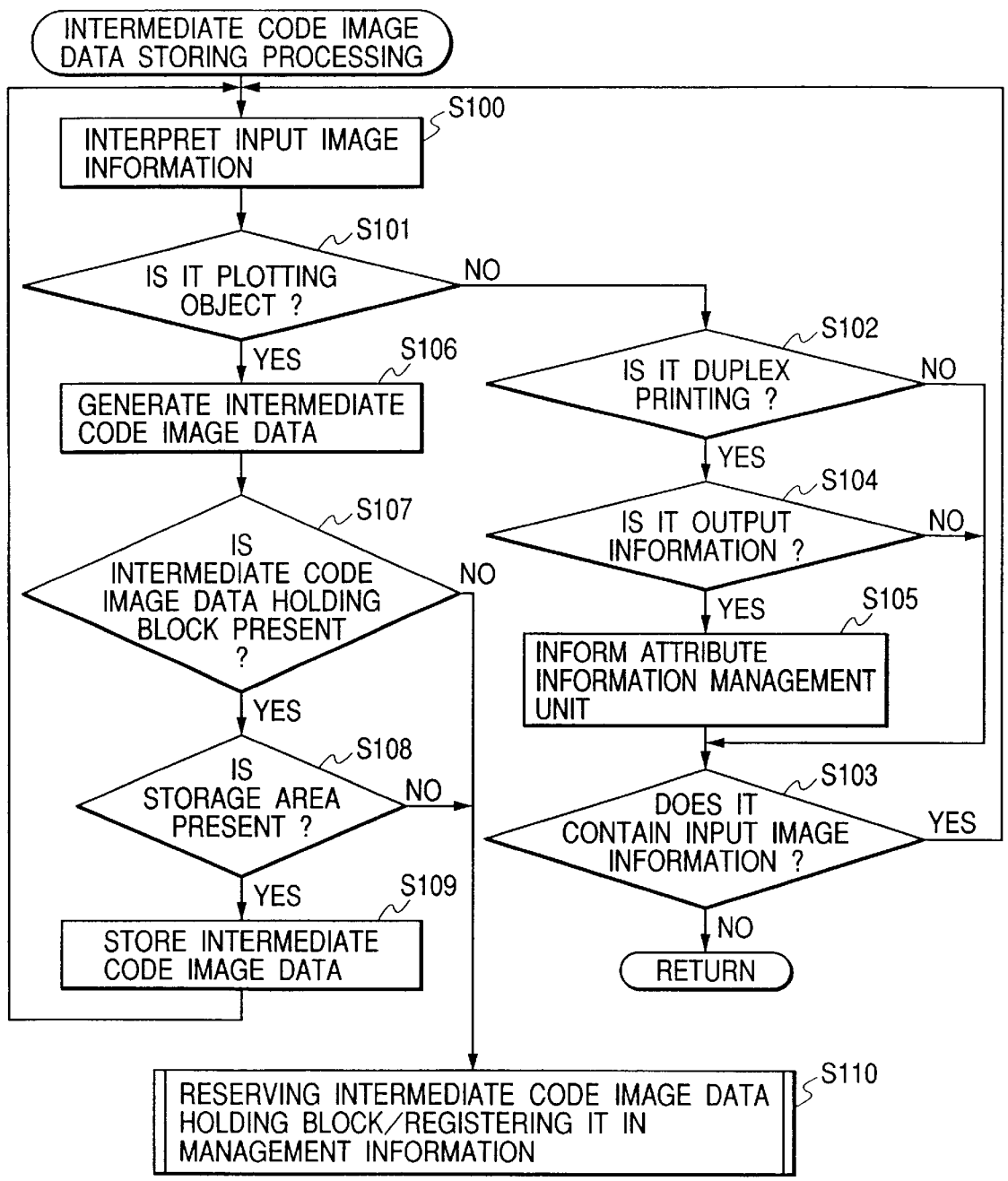
FIG. 6 is a flowchart to illustrate the storing processing of the intermediate code image data holding blocks in the above embodiment.

First, in the intermediate code image data storing processing shown in FIG. 6, the information is judged as the double face printing at step S102, and whether or not there is an output information that requires the 180° rotation is judged (S104). If it is judged that the 180° rotation is not needed, the processing advances to step S103; and if it is judged that the 180° rotation is required, the content to that effect is informed to the attribute information management unit 8, and then the processing advances to step S103.

Figure 9:
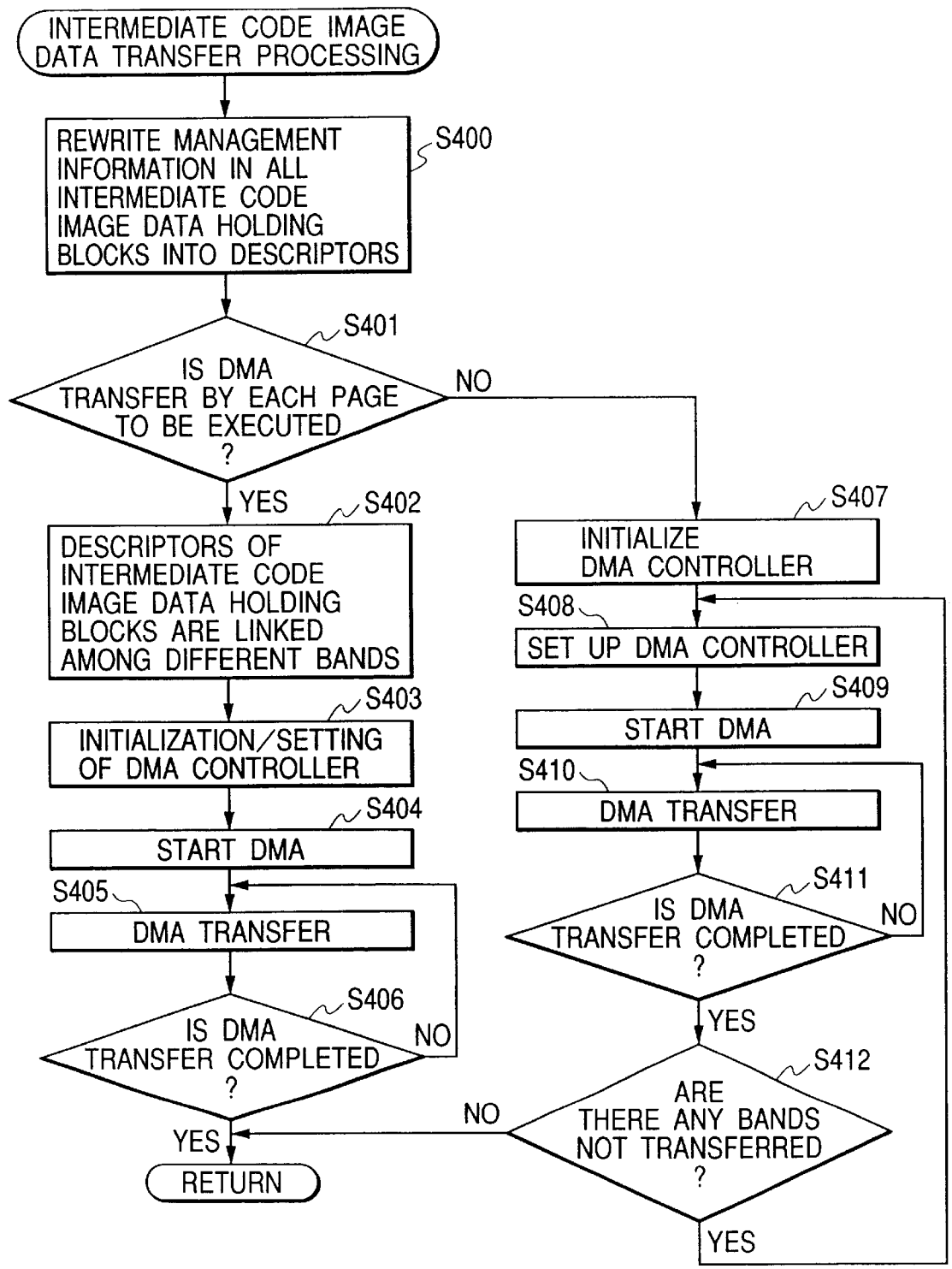
FIG. 9 is a flowchart to illustrate the transfer processing to the rendering unit in the above embodiment.

Next, in the intermediate code image data transfer processing shown in FIG. 9, the following processing is executed at step S402. Namely, output information is acquired from the history information management unit 8, and if it is judged that a page under process is-the rear page in double face printing whose image is required to be rotated by 180°, as shown in FIG. 17, the descriptors are linked with each other so as to invert the direction of linking the intermediate code image data holding blocks in the different bands.

Further, until the transfer processing to the output device, the output information is acquired from the history information management unit 8 at step S708. If the page under process is required for 180° rotation of the image, the contents of the band buffers are transferred to the output device in the last-come first-served (S710).

2.3. Effect of the Embodiment

The image processing device B achieves the following effects, in addition to the effects achieved by the image processing device A.

By controlling the output information, the image processing device B of the second embodiment switches the order of the bands that are transferred to the hardware rendering mechanism based on the output information, the direction of block linkage at the partition between the bands, and the direction of reading out the bit map data to the output device, which is generated in the band buffers by the hardware rendering mechanism. Thereby, the embodiment facilitates the processing of 180° image rotation required for the rear face printing in double face printing.

3. Modified Examples (1) Although both the image processing devices A and B take on the double buffer configuration provided with two band buffers, they may be provided with three or more. With such a configuration, while the bit map data is read from one band buffer and supplied to the output device, the expanded bit map data is stored in the other band buffer, and if the storage is completed in its early stage, the bit map data expanded into the third band buffer can be stored without putting the expansion processing of the following bands in a queue.

(2) The data with the raster expansion applied by the rendering unit is made to be transferred to the band buffers by the band buffer read/write controller; however, it is also possible to transfer by a two-channel DMA the data with the raster expansion applied by the rendering unit to the band buffers.

(3) In the second embodiment, in case of the rear page in the double face printing, the processing to invert the order of linkage is executed at step S402 in FIG. 9; however, instead of this processing, the processing of the rear page in the double face printing may be executed in the band partition information processing shown in FIG. 7. That is, after the void judgment is executed at step S201, whether Duplex or Simplex is judged. If it is Duplex, the inversion of the band number magnitude is executed, and thereafter, step S204 is needed to be executed.

In the inversion processing of band number magnitude, output information is acquired from the history information management unit 8 (S600). Then, checking is performed as to whether the page under process is a page required for 180° rotation or not (S601). And, only if it is a page required for 180° rotation is the magnitude of the band numbers inverted (the order of the band numbers is switched from the ascending order into the descending order) (S602).

EFFECT OF THE INVENTION

According to the present invention, in the image processing device that generates the intermediate code image data in unit of band to execute the rendering processing, the resources of the memory can effectively be used, and also the raster data can be generated in the buffer memory while supplying the intermediate code image data effectively to the plotting unit.

Further, high speed DMA transfer can be implemented during transferring the intermediate code image data to the plotting unit by rewriting the management information attached to the intermediate code image data and utilizing it as the management information for the DMA transfer.

What is claimed is:

1. An image processing device comprising:
   a generation part that interprets contents of code image data and generates a plurality of pieces of intermediate code image data for respective bands formed by dividing a page;
   a storage part that stores the plurality of pieces of the intermediate code image data generated by the generation part;
   a relation part that relates each of storage locations of the plurality of the pieces of intermediate code image data in the storage part with specific orders;
   a transfer part that reads the plurality of pieces of the intermediate code image data sequentially from the storage part with reference to the storage locations, and transfers them; and
   a plotting part that receives the plurality of pieces of the intermediate code image data transferred from the transfer part, interprets contents thereof to execute plotting of images, and stores image data of the plotted images in a buffer memory.

2. The image processing device according to claim 1, wherein the relation part relates each piece of the intermediate code image data to each corresponding band, and relates any pieces of the intermediate code image data with each other in the bands.

3. The image processing device according to claim 1, further comprising:
   a part that attaches management information including information relating to its own data quantity to each of the plurality of pieces of the intermediate code image data, wherein the relation part holds, in the management information of each piece of the intermediate code image data, information about the storage location in the storage part of the other piece of the intermediate code image data selected in consideration of plotting orders.

4. The image processing device according to claim 3, wherein the transfer part comprises:
   a management information utilization part that appropriately rewrites the management information and utilizes it as transfer management information for executing a DMA transfer; and
   a DMA control part that sequentially reads the management information appropriately rewritten by the management information utilization part, and transfers the plurality of pieces of the intermediate code image data stored in the storage part to the plotting part.

5. The image processing device according to claim 1, further comprising:
   a band partition information adding part that adds band partition information indicating a partition between the bands to each piece of the intermediate code image data stored by the storage part, wherein the plotting part plots each piece of the intermediate code image data transferred by the transfer part for each band in accordance with the band partition information.

6. The image processing device according to claim 1, further comprising:
   a page partition information adding part that adds page partition information indicating a partition between the pages to a last piece of the intermediate code image data in a page according to the plotting order, among the pieces of the intermediate code image data stored by the storage part, wherein the plotting part terminates plotting for one page by plotting the piece of the intermediate code image data having the page partition information added.

7. The image processing device according to claim 5, wherein the band partition information adding part transfers the band partition information from a band not having plotting components to a piece of the intermediate code image data in the other band having the plotting components.

8. The image processing device according to claim 6, wherein the page partition information adding part transfers the page partition information from a band not having the plotting components to a piece of the intermediate code image data in the other band having the plotting components.

9. The image processing device according to claim 1, further comprising:
   an output part that reads the image data stored in the buffer memory to output it to an output device, wherein, when switching a front image and a rear image for double face printing for each page to output them to the output device, the transfer part comprises a part that switches a reading order of the plurality of pieces of the intermediate code image data from the storage part for each page, and the output part comprises, a part that switches a direction of reading of the image data stored in the buffer memory for each page when the image data is stored to be read and output to the output device.

10. An image processing method comprising the steps of:
    interpreting contents of code image data and generating a plurality of pieces of intermediate code image data for respective bands formed by dividing a page;
    storing the plurality of pieces of the intermediate code image data in a storage part;
    relating each of storage locations of the plurality of pieces of the intermediate code image data in the storage part in specific orders;
    reading the plurality of pieces of the intermediate code image data sequentially from the storage part with reference to the storage locations, and transferring them; and
    receiving the plurality of pieces of the intermediate code image data transferred, interpreting contents thereof to execute plotting of images, and storing image data of the plotted images in a buffer memory.

11. A recording medium on which is recorded a program to execute the image processing method claimed in claim 10.

* * * * *